(12) United States Patent
Pinkerton et al.

(10) Patent No.: US 9,278,502 B2
(45) Date of Patent: Mar. 8, 2016

(54) ENCAPSULATED MICRO-BUBBLE MATERIALS AND METHODS TO MAKE AND USE SAME

(75) Inventors: Joseph F. Pinkerton, Austin, TX (US); William Neil Everett, Cedar Park, TX (US)

(73) Assignee: Clean Energy Labs, LLC, Austin, TX (US)

( * ) Notice: Subject to any disclaimer, the term of this patent is extended or adjusted under 35 U.S.C. 154(b) by 235 days.

(21) Appl. No.: 14/130,446

(22) PCT Filed: Jul. 2, 2012

(86) PCT No.: PCT/US2012/045310
§ 371 (c)(1),
(2), (4) Date: Mar. 10, 2014

(87) PCT Pub. No.: WO2013/006581
PCT Pub. Date: Jan. 10, 2013

(65) Prior Publication Data
US 2014/0165545 A1 Jun. 19, 2014

Related U.S. Application Data

(60) Provisional application No. 61/504,105, filed on Jul. 1, 2011.

(51) Int. Cl.
*B32B 9/00* (2006.01)
*B32B 9/04* (2006.01)
*F15B 15/00* (2006.01)
*B32B 3/26* (2006.01)

(52) U.S. Cl.
CPC ............... *B32B 9/007* (2013.01); *B32B 3/263* (2013.01); *B32B 9/04* (2013.01); *F15B 15/00* (2013.01); *B32B 2605/18* (2013.01); *Y10T 428/24661* (2015.01)

(58) Field of Classification Search
CPC .......... B32B 9/007; B32B 3/263; B32B 9/04; B32B 2605/18; F15B 15/00
See application file for complete search history.

(56) References Cited

U.S. PATENT DOCUMENTS

| | | | |
|---|---|---|---|
| 5,663,608 | A | 9/1997 | Jones et al. |
| 5,873,464 | A | 2/1999 | Haley |
| 6,631,603 | B2 | 10/2003 | Zornes |
| 2005/0031832 | A1 | 2/2005 | Kannankeril et al. |
| 2009/0274880 | A1 | 11/2009 | Iwasaka et al. |
| 2009/0324897 | A1 | 12/2009 | Choi et al. |
| 2010/0116630 | A1 | 5/2010 | Pinkerton |
| 2011/0111303 | A1 | 5/2011 | Kung et al. |
| 2011/0123776 | A1 | 5/2011 | Shin et al. |

FOREIGN PATENT DOCUMENTS

WO 2013/006581 A1 1/2013

OTHER PUBLICATIONS

Patent Cooperation Treaty; PCT International Search Report, Issued in Connection with PCT/US2012/045310; Nov. 8, 2012; 5 pages; Europe.
Patent Cooperation Treaty; PCT Written Opinion of the International Searching Authority, Issued in Connection with PCT/US2012/045310; Nov. 8, 2012; 10 pages; Europe.

*Primary Examiner* — Brian M O'Hara
*Assistant Examiner* — Michael Kreiner
(74) *Attorney, Agent, or Firm* — Greenberg Traurig, LLP; Ross Spencer Garsson

(57) ABSTRACT

Graphene materials having encapsulated gas cells and methods to make and use same. Alternative electrically conductive and atomically thin materials (such as graphene oxide) can be used alternatively or in addition to the graphene in the graphene encapsulated micro-bubble materials.

22 Claims, 31 Drawing Sheets

US 9,278,502 B2

ENCAPSULATED MICRO-BUBBLE MATERIALS AND METHODS TO MAKE AND USE SAME

CROSS-REFERENCE TO RELATED APPLICATION

This application is the 35 U.S.C. 371 national application of International Patent Application No. PCT/US2012/0045310, filed Jul. 2, 2012, which designated the United States and claimed priority to provisional U.S. Patent Application Ser. No. 61/504,105, filed on Jul. 1, 2016. Both of these patent applications are entitled "Encapsulated Micro-Bubble Materials and Methods to Make and Use Same," are each commonly assigned to the Assignee of the present invention, and are hereby incorporated herein by reference in their entirety for all purposes.

TECHNICAL FIELD

The present invention relates to graphene materials having encapsulated micro-bubbles and methods to make and use same. Alternative electrically conductive and atomically thin materials (such as graphene oxide) can be used alternatively or in addition to the graphene in the encapsulated gas-cell materials.

SUMMARY OF THE INVENTION

Graphene membranes (also otherwise referred to as "graphene drums") have been manufactured using process such as disclosed in Lee et al. Science, 2008, 321, 385-388. A graphene membrane is atomically thin. Graphene sheets—one-atom-thick two-dimensional layers of $sp^2$-bonded carbon—have a range of unique electrical, thermal and mechanical properties.

The present invention relates to novel materials having encapsulated gas cells, methods to make them, and method to use them. Such materials are referred to as "encapsulated micro-bubble materials" because the material includes a number of cells (or pockets) filled with gas. The average size of an individual cell of gas in the encapsulated micro-bubble materials is on the order of microns and nanometers, such as less than about 1000 μm. Generally, the average size of the encapsulated micro-bubbles is between about 0.01 μm and about 500 μm, typically between about 10 μm and about 100 μm, and more typically between about 25 μm and about 50 μm. The materials of the present invention are made of electrically and atomically thin materials (such as, for example, graphene, graphene oxide, and graphene/graphene oxide composites), which renders the materials of the present invention much stronger (on the order of metals, like aluminum), electrically conductive, and heat resistant (up to about 750° C. and, in some embodiments much higher). Furthermore, the encapsulated micro-bubble materials of the present invention can be lighter than air.

The encapsulated micro-bubble material of the present invention can be used as a structural material (particularly in aerospace applications due to the materials high strength to weight ratio). Other uses of the encapsulated micro-bubble include that can be combined with thin film solar cells and graphene pumps to create a mobile system that can hover and move indefinitely without fuel.

Having encapsulated micro-bubble material allows for cells of gas to be incorporated into the graphene (or other materials) and retained for extended periods of time. Thus, is not simply a graphene foam assembly, such as described in Chen et al. "Three-dimensional flexible and conductive interconnect graphene networks grown by chemical vapour deposition," *Nature Materials* 2011. Unlike embodiments of the present invention, graphene foams are fragmented, random, and incapable of containing a pressurized gas. Because of this, graphene foams result in material that is weak (as opposed to encapsulated micro-bubble material which can increase the strength of the graphene or other atomically thin material) and graphene foams are incapable of being lighter than air (which encapsulated micro-bubble material can be depending upon the gas utilized).

In general, in one aspect, the invention features a method that includes forming a first sheet. The first sheet includes one or more layers of a first atomically thin material. The first sheet has an array of open three-dimensional features. The three-dimensional features open are open on a first side of the first sheet. The method includes positioning a second sheet on the first sheet. The second sheet includes one or more layers of a second atomically thin material. During the position of the second sheet on the first sheet, the three-dimensional features are closed to form an array of closed three-dimensional features of an encapsulated micro-bubble material.

Implementations of the invention can include one or more of the following features:

The first atomically thin material can be graphene, graphene oxide, graphene/graphene oxide, or a combination thereof. The second atomically thin material can be graphene, graphene oxide, graphene/graphene oxide, or a combination thereof.

The first atomically thin material can be graphene. The second atomically thin material can be graphene.

The step of forming the first sheet can include applying a force to create the array of open three-dimensional features. The force can be an electrostatic force, gas pressure, or a combination thereof.

The force can include an electrostatic force.

The force can include gas pressure.

The step of forming the first sheet can include selecting a substrate having an array of wells, positioning one or more layers of the first atomically thin material over the substrate, and forming the array of open three-dimensional features within the array of wells when applying the force.

The wells can have an average diameter less than about 1000 μm.

The second sheet can be positioned on the first sheet while applying the force.

The substrate can be removed from the encapsulated micro-bubble material.

The step of forming the first sheet can include positioning an array of objects onto a growth substrate, growing the first atomically thin material on the growth substrate, and removing the substrate to open the array of three-dimensional features of the first sheet. The step of growing the first atomically thin material on the growth surface can include that an array of three-dimensional features are formed over the array of objects.

The objects can have an average diameter less than about 1000 μm.

The objects can be spheres. The objects can be positioned onto the growth substrate by pressing the objects into the growth substrate.

The step of forming the first sheet can include creating an array of protrusions on a growth substrate, growing the first atomically thin material on the growth substrate, and removing the substrate to open the array of three-dimensional features of the first sheet. The step of growing the first atomically thin material on the growth substrate can include that an array of three-dimensional features are formed over the array of protrusions.

The protrusions can have an average diameter less than about 1000 μm.

The array of protrusions can be an array of temporary protrusions.

The step of forming the first sheet can include selecting a metal foil, growing the first atomically thin material on the metal foil to form a metal-atomically thin material composite sheet, and removing portions of the metal foil from the first side of the metal-atomically thin material composite sheet to expose the first atomically thin material and to open the array of three-dimensional features of the first sheet. The first side of the metal-atomically thin material composite sheet can include the metal foil. The second side of the metal-atomically thin material composite sheet can include the atomically thin material.

The step of forming the first sheet can further include etching an array of depressions in the metal foil before the step of growing the first atomically thin material on the metal foil.

The step of forming the first sheet can further include depositing a thin layer of metal on the second side of the metal-atomically thin material composite sheet.

An array of nm sized metal can be deposited on the second side of the metal-atomically thin material composite sheet to form an array of protrusions of the metal-atomically thin material composite sheet.

The array of protrusions can be etched and coated with a metal such that at least some of protrusions in the array each collapse to a small point to create an array of free-standing field emission sources.

The depressions can have an average diameter less than about 1000 μm.

The metal foil can be a copper foil.

The metal foil can be removed by an etching process.

The first sheet can include at least two layers of graphene.

The second sheet can include at least two layers of graphene.

The first atomically thin material and the second atomically thin material can be the same material.

The first sheet can include a layer of graphene and a layer of graphene oxide.

The first sheet can include graphene. The second sheet can include graphene oxide.

The closed three-dimensional features can include a gas.

The gas can have a pressure greater than one atmosphere.

The gas can include helium.

The encapsulated micro-bubble material can float in air at room temperature and pressure.

The encapsulated micro-bubble material can be a one-sided encapsulated micro-bubble material.

The encapsulated micro-bubble material can be a two-sided encapsulated micro-bubble material.

The method can further include layering the encapsulated micro-bubble material with a second micro-bubble material to form a layered micro-bubble material.

The closed-three dimensional features can have an average size less than about 1000 μm.

The closed three-dimensional features can have an average size between about 0.01 μm and about 500 μm.

The closed three-dimensional features can have an average size between about 10 μm and about 100 μm.

The closed three-dimensional features can have an average size between about 25 μm and about 50 μm.

In general, in another aspect, the invention features an encapsulated micro-bubble material that includes a first sheet. The first sheet includes one or more layers of a first atomically thin material. The first sheet has a first side. The encapsulated micro-bubble material further includes a second sheet. The second sheet includes one or more layers of a second atomically thin material. The second sheet has a first side. A first portion of the first side of the first sheet is in direct contact with a first portion of the first side of the second sheet. A second portion of the first side of the first sheet is not in direct contact with a second portion of the first side of the second sheet. The encapsulated micro-bubble material further includes an array of sealed three-dimensional cells positioned between the first side of the first sheet and the first side of the second sheet. The boundary of the sealed three-dimensional cells include the second portion of the first side of the first sheet and the second portion of the first side of the second sheet. A gas is contained within the array of sealed three-dimensional cells.

Implementations of the invention can include one or more of the following features:

The first atomically thin material can be graphene, graphene oxide, graphene/graphene oxide, or a combination thereof. The second atomically thin material can be graphene, graphene oxide, graphene/graphene oxide, or a combination thereof.

One or both of the first atomically thin material and the second atomically thin materials can include graphene.

The first atomically thin material and the second thin material can each be graphene.

The first sheet can further include a metal foil. The first side of the first sheet can be the atomically thin material. The second side of the first sheet can be the metal foil having portions through which the atomically thin material from the first side of the sheet is exposed.

The first sheet can include at least two layers of graphene.

The second sheet can include at least two layers of graphene.

The first atomically thin material and the second atomically thin material can be the same material.

The first sheet can include a layer of graphene and a layer of graphene oxide.

The first sheet can include graphene. The second sheet can include graphene oxide.

The pressure of the gas can be greater than one atmosphere.

The gas can include helium.

The encapsulated micro-bubble material can float in air at room temperature and pressure.

The encapsulated micro-bubble material can be a one-sided encapsulated micro-bubble material.

The encapsulated micro-bubble material can be a two-sided encapsulated micro-bubble material.

The closed three-dimensional features can have an average size of at most about 1000 μm.

The closed three-dimensional features can have an average size between about 0.01 μm and about 500 μm.

The closed three-dimensional features can have an average size between about 10 μm and about 100 μm.

The closed three-dimensional features can have an average size between about 25 μm and about 50 μm.

In general, in another aspect, the invention features an assembly that includes an encapsulated micro-bubble material.

Implementations of the invention can include one or more of the following features:

The encapsulated micro-bubble material can include one or more of the encapsulated micro-bubble materials described above.

The can be a mobile assembly. The assembly can further include an array of pumps.

The array of pumps can be an array of membrane pumps. The membrane pumps can be graphene membrane pumps. The assembly can further include a solar cell.

The solar cell can be a thin film solar cell.

The assembly can further include a battery.

The assembly can further include a microprocessor.

The assembly can further include a global positioning device.

The assembly can further include a wireless communications device.

The assembly can further include a cable.

The assembly can further include a stationary generator. The stationary generator can connected to the cable.

The assembly can further include a solar cell and a stationary power conversion system that is connected to the solar cell and the cable.

The assembly can further include a solar cell and a stationary generator connected to the solar cell and the cable.

The assembly of claim 69 can further include a force sensor connected to the cable.

The encapsulated micro-bubble material can be a coated encapsulated micro-bubble material.

The coated encapsulated micro-bubble material can include graphene.

The encapsulated micro-bubble material can include an oxygen-free gas. The coating can be a high temperature coating.

The coating can include titanium-nitride.

The encapsulated micro-bubble material can be a heat resistant material operable to withstand heat of temperatures up to 3000° C.

The assembly can be a jet, a rocket, or an automobile.

The coated encapsulated micro-bubble material can be operably connected to an engine of the assembly to provide heat resistance.

In general, in another aspect, the invention features a mobile device that includes a lightweight material and an array of membrane pumps operatively connected to the lightweight material. The membrane pumps are operable for propelling and stabilizing the mobile device.

Implementations of the invention can include one or more of the following features:

The mobile device can further include a solar cell and an electronic controller. The solar cell and the electronic controller can be are operatively connected to the membrane pump.

The lightweight materials can include encapsulated micro-bubble material.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

DETAILED DESCRIPTION

Graphene membranes (also otherwise referred to as "graphene drums") have been manufactured using process such as disclosed in Lee et al. Science, 2008, 321, 385-388. A graphene membrane is atomically thin. Graphene sheets—one-atom-thick two-dimensional layers of $sp^2$-bonded carbon—have a range of unique electrical, thermal and mechanical properties. Other atomically thin materials also exist that have their own unique electrical, thermal, and mechanical properties. Such atomically thin materials include graphene oxide and graphene/graphene oxide composites, such as described and discussed in commonly owned U.S. patent application Ser. No. 13/152,122 (Everett et al.), filed Jun. 2, 2011.

While embodiments of the present invention having graphene are discussed and described herein, the thin membranes utilized in the present invention are not limited to only graphene. Rather, the thin membranes can be any thin material that is sufficiently mechanically robust (such as, for example, a thin membrane of graphene oxide or any combination of materials that form a sufficiently robust composite material, such as a thin membrane of graphene and graphene oxide) to span the lateral dimensions of the target substrate feature (such as micro or nano wells). Thus, the discussion of graphene is for exemplary purposes and is not intended to limit the scope of the present invention.

Furthermore, the thin membranes used in the present invention are generally a membrane that is atomically thin. For single-layer graphene membranes, the thickness is sub-nanometer; membranes containing multiple graphene layers, graphene/graphene oxide composites, etc. are typically on the order of about 1 to about 25 nanometers.

Figure 1:
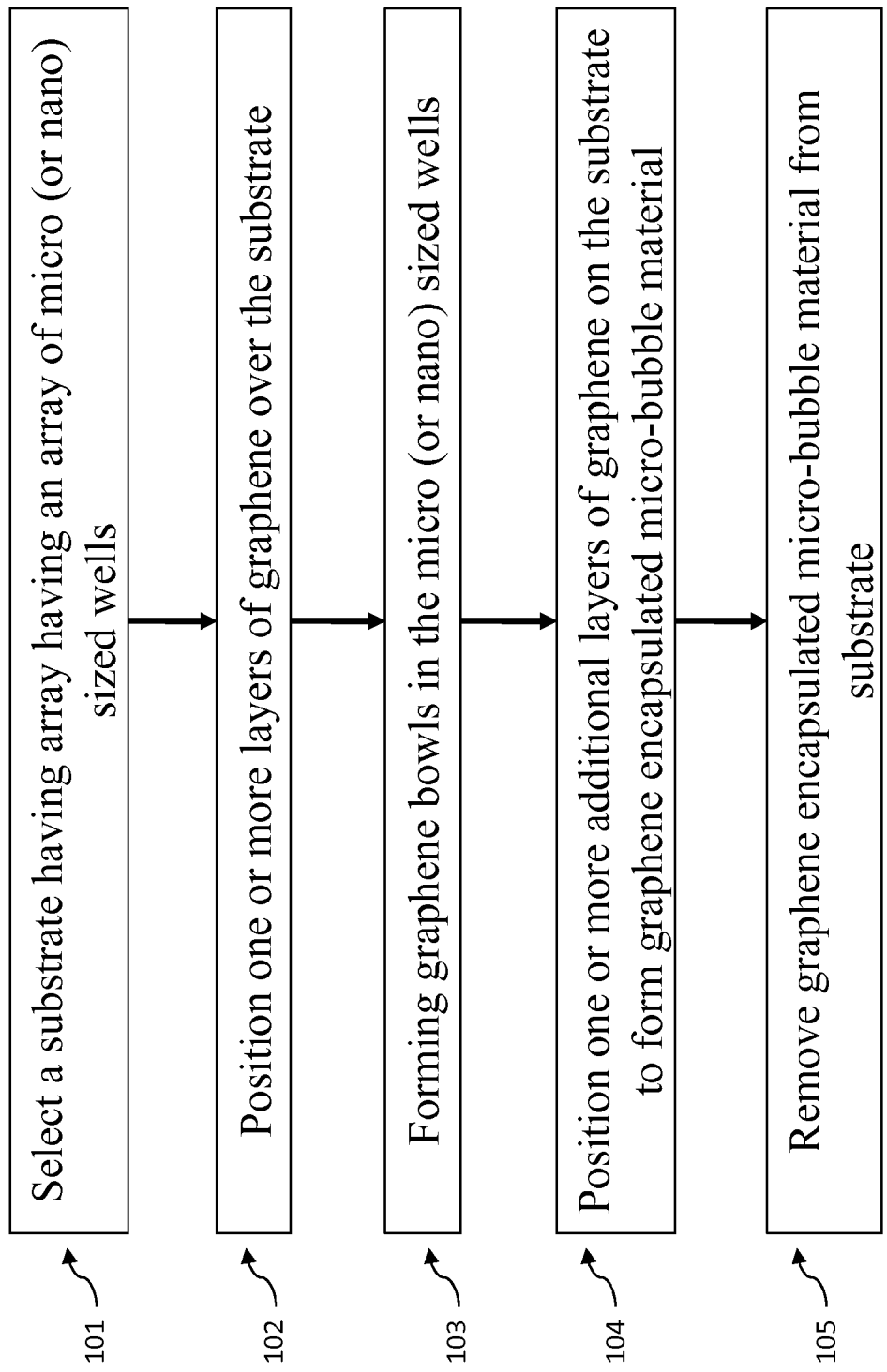
FIG. 1 shows general steps of a process to make a graphene encapsulated micro-bubble material according to an embodiment of the present invention.
Figure 2:
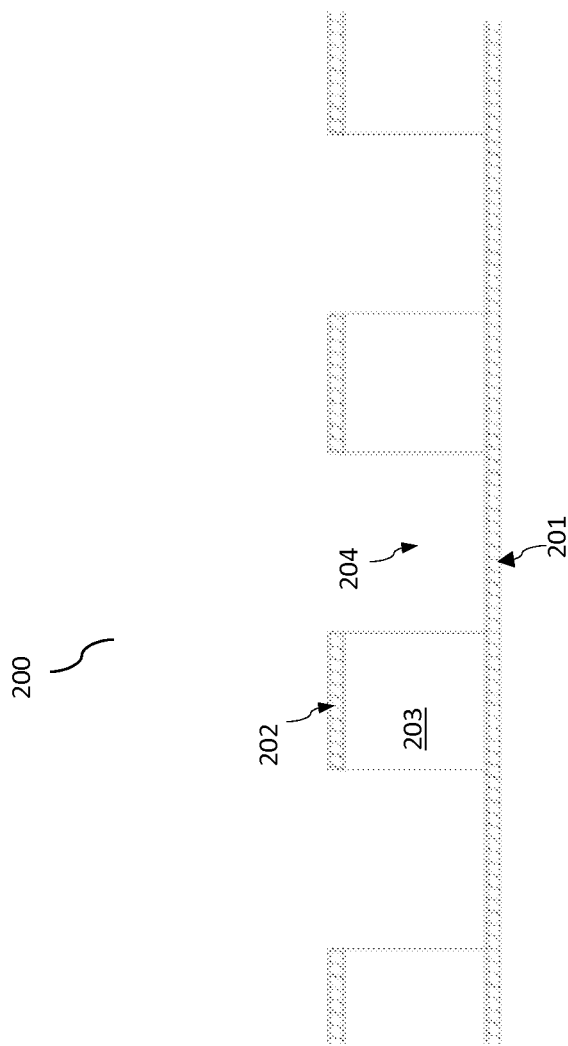
FIG. 2 depicts a side-view of a substrate having an array of micro (or nano) diameter holes that can be selected in step 101 shown in the process of FIG. 1.
Figure 3:
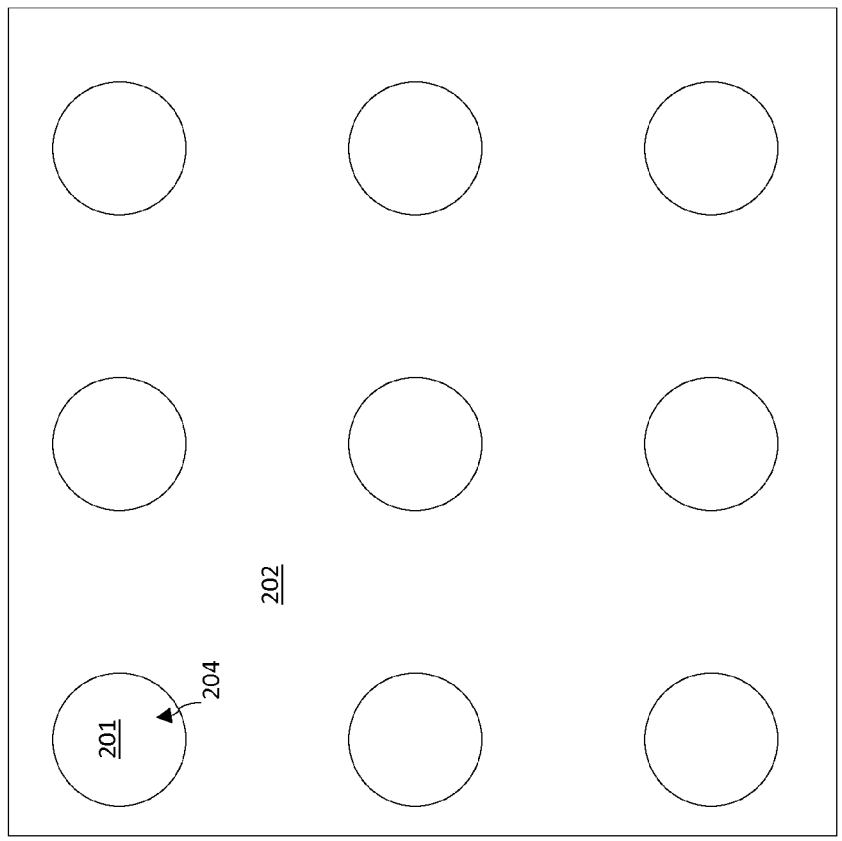
FIG. 3 depicts an overview of the substrate shown in FIG. 2.

Referring to the figures, FIG. 1 shows the general steps of a process to make graphene encapsulated micro-bubble materials according to an embodiment of the present invention. In step 101 of FIG. 1, a substrate having an array of micro (or nano) sized wells is selected. FIG. 2 depicts a side-view of a substrate 200 that can be selected in step 101 shown in the process of FIG. 1. In the orientation shown in FIG. 2, substrate 200 has a base 201 that is a metal (such as copper). Insulator material 203 (such as silicon dioxide) rests atop the base 201, with wells 204 (also called holes) exposing the metal of base 201 at their bottoms. On top of insulator material 203 is a metal 202. FIG. 3 depicts an overview of substrate 200 shown in FIG. 2.

Figure 4:
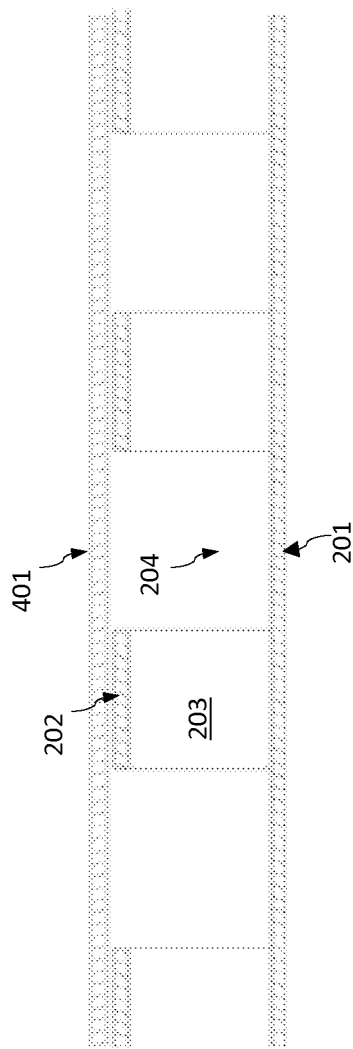
FIG. 4 depicts a side view of an embodiment of the present invention during step 102 shown in the process of FIG. 1.

Continuing with the process shown in FIG. 1, in step 102, one or more layers of graphene (or other electrically conductive membranes) are positioned over the substrate 100. This graphene sheet is generally comprised of 1 to 10 layers of graphene. FIG. 4 depicts a side view of an embodiment of the present invention during step 102. Graphene sheet 401 is positioned on substrate 200 such that it is over the array of wells 204 and rests upon metal 202. Optionally, a thermal release material (not shown) can be applied to the surface of 202 before contacting the graphene sheet 401 with substrate 200. The thermal release material will later facilitate separation of the substrate from the encapsulated micro-bubble material formed.

Examples of processes by which the graphene sheet can be made and positioned on this substrate are disclosed and taught in the following co-owned patent applications: PCT Patent Appl. Publ. No. WO 2010/039983, published Apr. 4, 2010, (PCT Patent Appl. No. PCT/US09/59266, filed Oct. 1, 2009) (Pinkerton) (describing tunneling current switch assemblies having graphene drums (which graphene drums generally having a diameter between about 500 nm and about 1500 nm); PCT Patent Application No. PCT/US2011/023618 (Pinkerton), filed Feb. 3, 2011 (describing the use of graphene drums in pump systems and engine systems); U.S. Patent Appl. No. 61/427,011 (Everett et al.), filed Dec. 23, 2010 (describing making graphene windows, and methods to transfer the graphene of the graphene window to other substrates; U.S. patent application Ser. No. 13/098,101 (Lackowski et al.), filed Apr. 29, 2011 (describing a method for aligned transfer of thin membranes (such as graphene) to substrates; and U.S. patent application Ser. No. 13/152,122 (Everett et al.), filed Jun. 2, 2011 (describing composite membranes (graphene/graphene oxide platelet composite membranes) and methods of transferring such composite membranes to other substrates).

Figure 5:
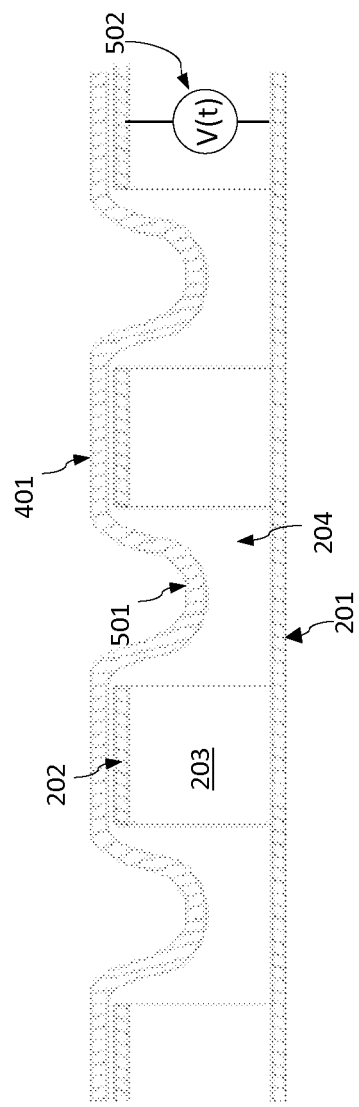
FIG. 5 depicts a side view of an embodiment of the present invention during step 103 shown in the process of FIG. 1.
Figure 6:
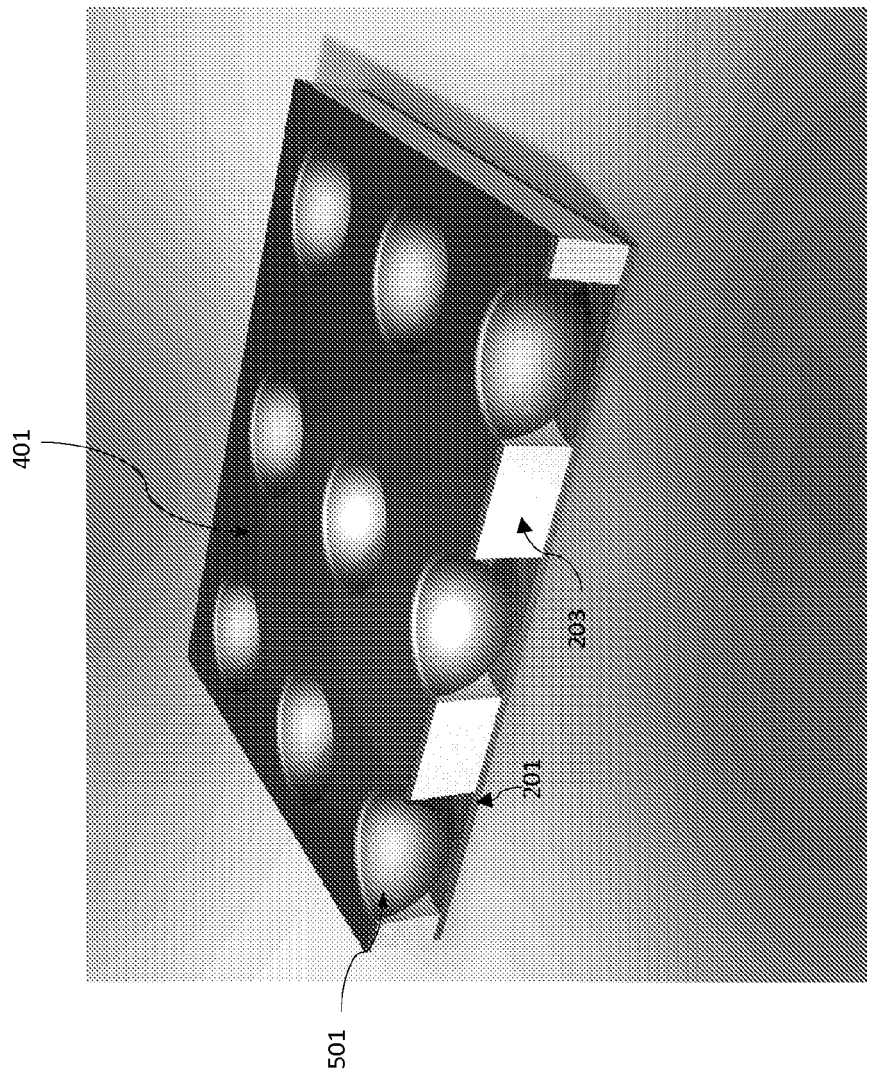
FIG. 6 depicts a different illustration of the embodiment of the present invention shown in FIG. 5.

Continuing with the process shown in FIG. 1, in step 103, graphene bowls of the graphene are formed in the wells. FIG. 5 depicts a side view of an embodiment of the present invention during step 103. Bowls 501 of the graphene 401 in wells 204 can be formed by placing a voltage 502 between graphene 401 and metal 201 such that an electrostatic force causes graphene 401 to be pulled toward metal 201 in the wells 204. Such systems and process for doing so are further described and taught in PCT Patent Appl. Publ. No. WO 2010/039983, published Apr. 4, 2010, (PCT Patent Appl. No. PCT/US09/59266, filed Oct. 1, 2009) (Pinkerton) and PCT Patent Application No. PCT/US2011/023618 (Pinkerton), filed Feb. 3, 2011. Other methods can also be used alternatively or in tandem to form bowls 501. For instance, bowls 501 can alternatively be formed by applying a pressure differential across graphene 401 (i.e., increasing the pressure applied outside the wells 204 or reducing the pressure inside wells 204 will cause the graphene to form bowls as shown in FIG. 5). Furthermore, for instance, the pressure differential and electrostatic forces can be used in tandem to form bowls 501. FIG. 6 depicts a different illustration of the embodiment of the present invention shown in FIG. 5.

Figure 7:
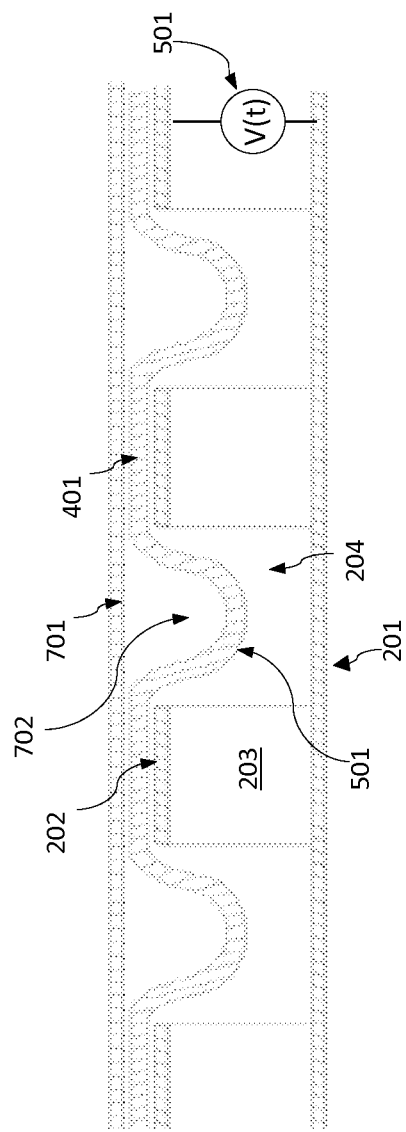
FIG. 7 depicts a side view an embodiment of the present invention during step 104 shown in the process of FIG. 1.

Continuing with the process shown in FIG. 1, in step 104, another graphene sheet (or other sheet made of other electrically conductive membrane layers) is position on the first sheet to form the encapsulated micro-bubble material. FIG. 7 depicts of side view an embodiment of the present invention during step 104 shown in the process of FIG. 1. Sheet 701 (such as a graphene sheet containing 1 to 10 layers of graphene) is positioned on top of graphene sheet 401, while graphene bowls 501 are held in place. This forms cells (or pockets) 702. Sheets 401 and 701 are capable of completely sealing cells 702 formed by them (due to Van der Waals forces). If step 104, takes place in air, the cells 702 will be filled with air. Gases can be used, such as helium or another light gas, in lieu of air, and it is these gases that will be in the cells 702. Alternatively, the cells can be sealed while the substrate 200 is submerged, which would render liquid as the fluid encased in cells 702. Moreover, the fluids can be pressurized, which pressure would remain in cells 702 after sealing. Such conditions, type of fluid and pressure can be varied depending upon the application to which the encapsulated micro-bubble material is to be utilized.

Figure 8:
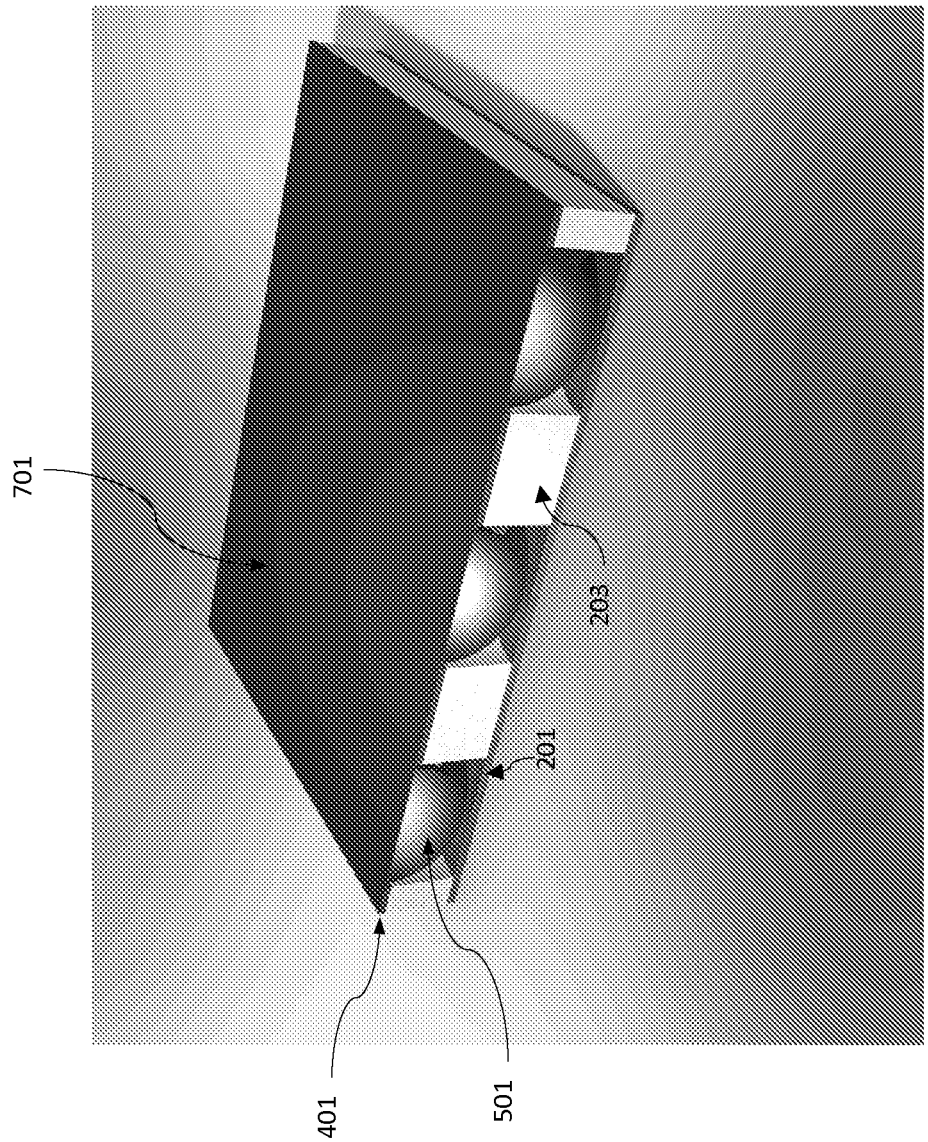
FIG. 8 depicts a different illustration of the embodiment of the present invention shown in FIG. 7.

Despite the small size of the cells 702 (microns), when helium or another light gas is used, the resulting encapsulated micro-bubble material can be lighter than air due to the thinness of the graphene or other thin membrane materials (about 3.3 angstroms per layer). Van der Waals forces will hold the flat or bowl-shaped layers (sheets 401 and 701) together and a higher internal pressure (relative to atmospheric pressure) will keep the cells 702 from deflating. Furthermore, cells 702 should be able to maintain this pressure differential for years since sheets made of well-made graphene (and other electrically conductive membranes) are impermeable to even small gas molecules, such as hydrogen. FIG. 8 depicts a different illustration of the embodiment of the present invention shown in FIG. 7.

Continuing with the process shown in FIG. 1, in step 105, the encapsulated micro-bubble material is removed from the substrate. One manner to accomplish this release is by heating the structure to a temperature that alters the adhesion properties of the metal 202. Another method is to pressurize the small chambers formed between bowls 501 and the bottom of wells 204 (using gas channels not shown in the current figures, but discussed and shown in PCT Patent Application No. PCT/US2011/023618 (Pinkerton), filed Feb. 3, 2011) to push the encapsulated micro-bubble material off substrate 200. Yet another method would be to simply peel the encapsulated micro-bubble material off like tape. As noted above, each of these methods of removal can be facilitated or augmented by applying a thermal release material to the surface of 202 before contacting the graphene sheet 401 with substrate 200.

Figure 9:
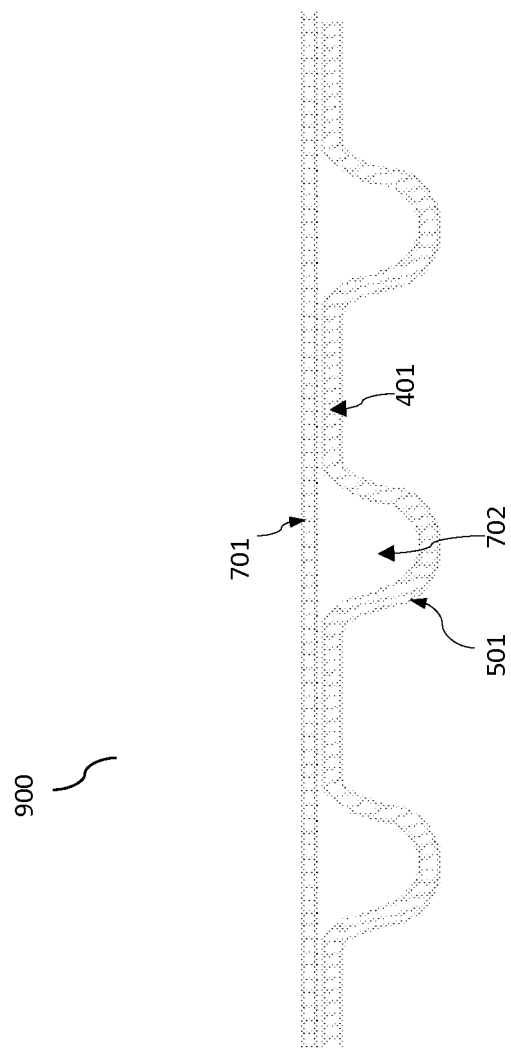
FIG. 9 depicts a side view an embodiment of the present invention (of a one-sided encapsulated micro-bubble material) during step 105 shown in the process of FIG. 1.
Figure 10:
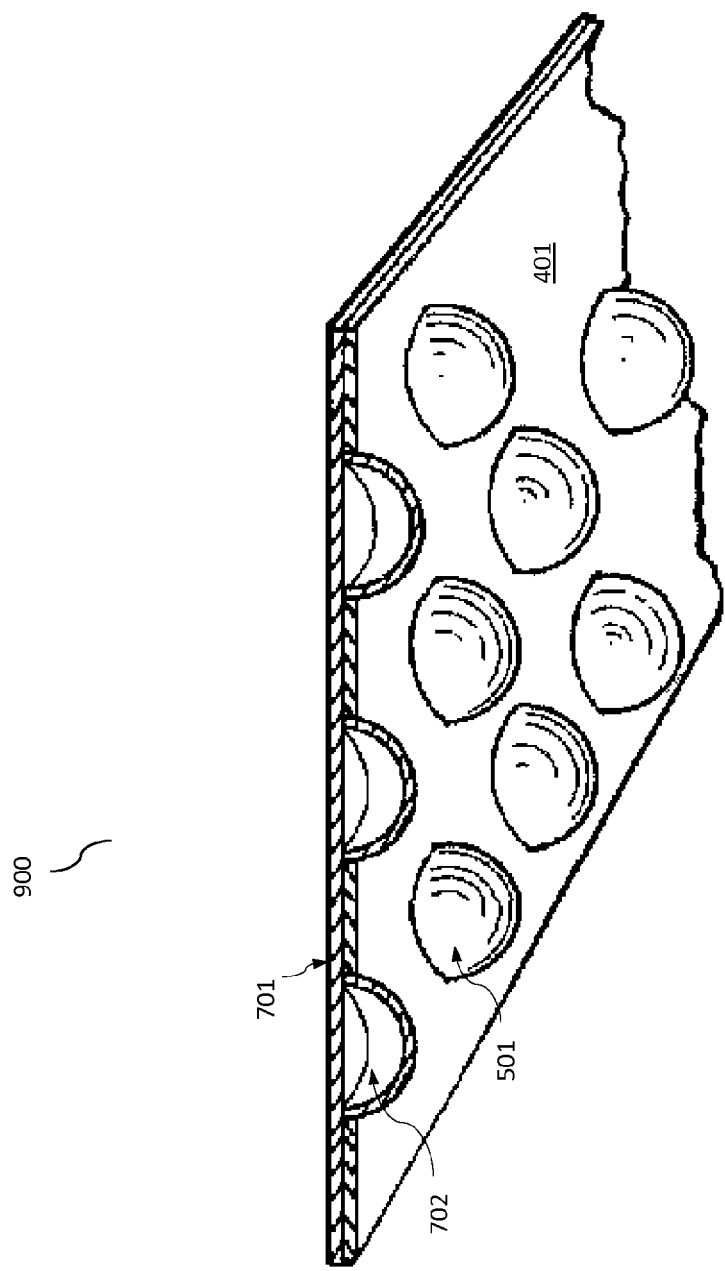
FIG. 10 depicts a different illustration of the embodiment of the present invention shown in FIG. 9.
Figure 11:
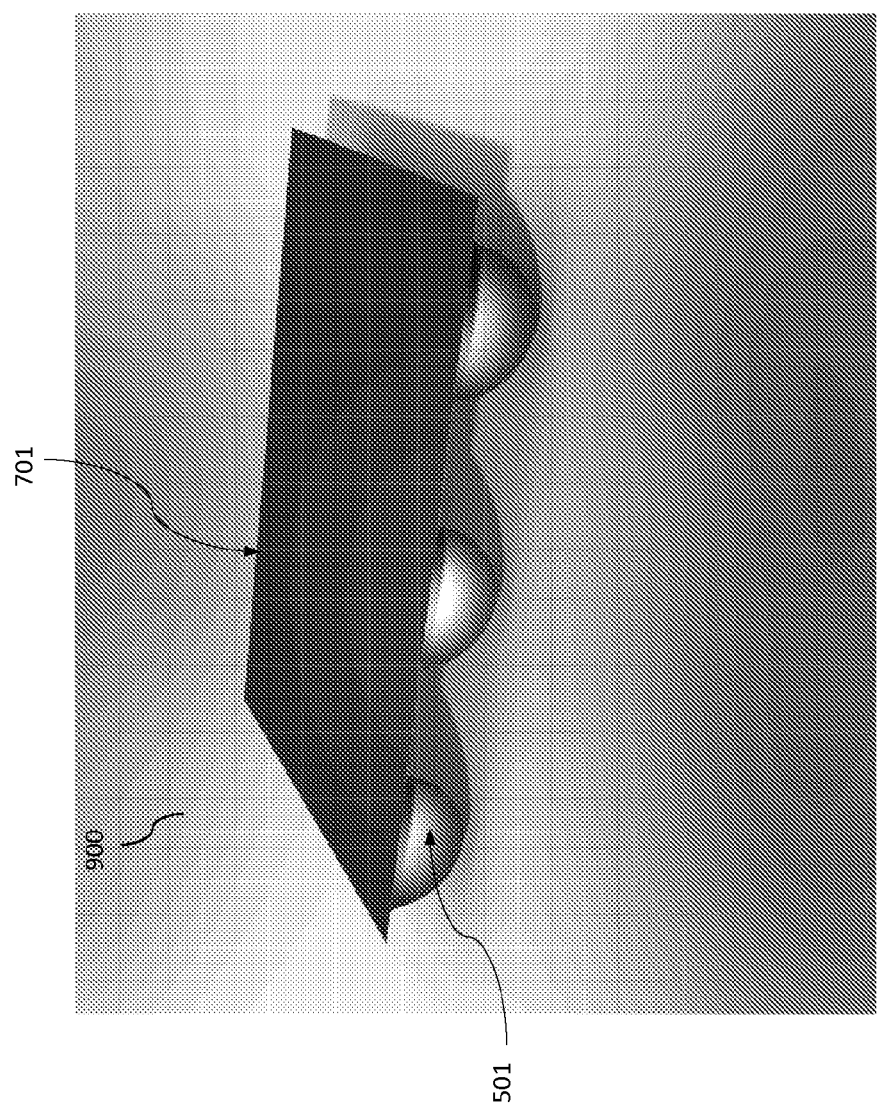
FIG. 11 depicts a different illustration of the embodiment of the present invention shown in FIG. 9.

FIG. 9 depicts a side view an embodiment of the present invention during step 105 shown in the process of FIG. 1. Encapsulated micro-bubble material 900 is shown after substrate 200 has been removed. In the illustration depicted in FIG. 9, the conditions are shown to have resulted in cells 702 being on one side of the encapsulated micro-bubble material 900. Stated otherwise, sheet 701 remains flat after the removal of substrate 200, which results in "one-sided encapsulated micro-bubble" material 900. Reasons why sheet 701 will or will not remain flat include, among others, the type of material for sheets 701 and 401, the number of layers in these sheets, the fluid pressure inside cells 702, temperature conditions, size of the wells 104, and degree of deflection of bowls 501 when forming the cells 702. Each of FIGS. 10-11 depicts a different illustration of the embodiment of the present invention shown in FIG. 9.

Figure 12:
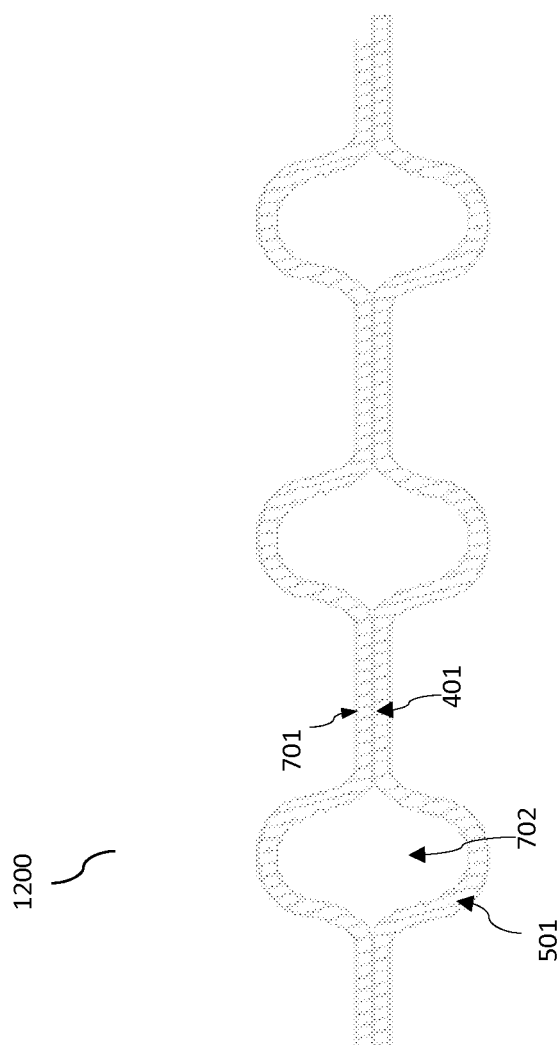
FIG. 12 depicts of side view another embodiment of the present invention (of a two-sided encapsulated micro-bubble material) during step 105 shown in the process of FIG. 1.
Figure 13:
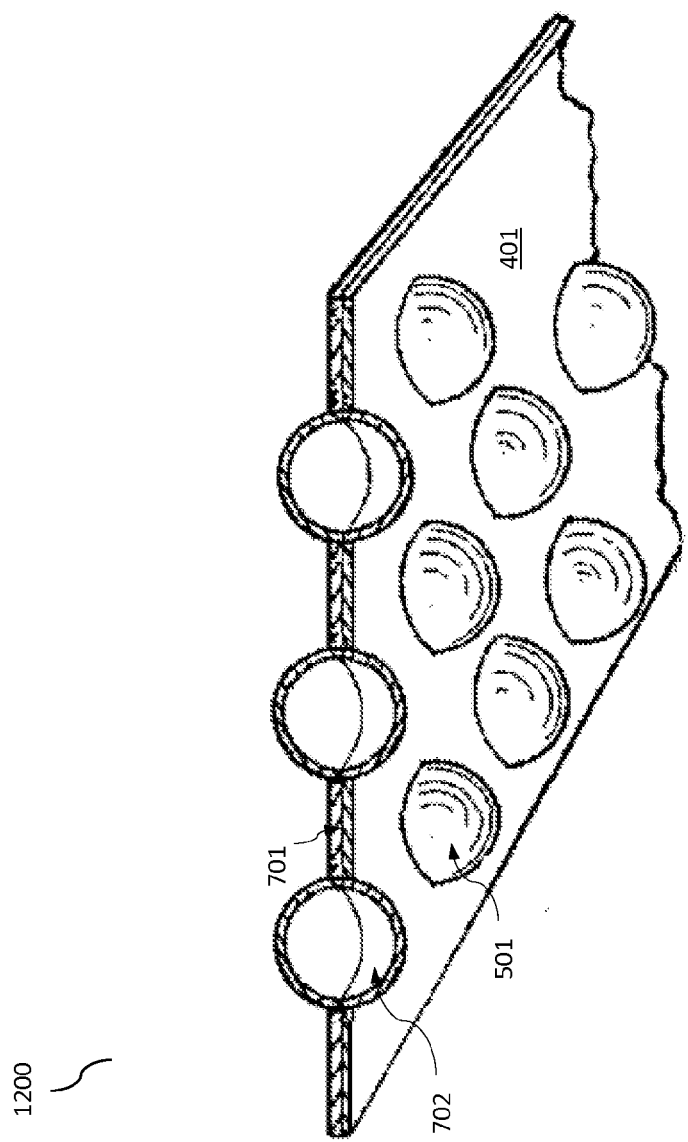
FIG. 13 depicts a different illustration of the embodiment of the present invention shown in FIG. 12.
Figure 14:
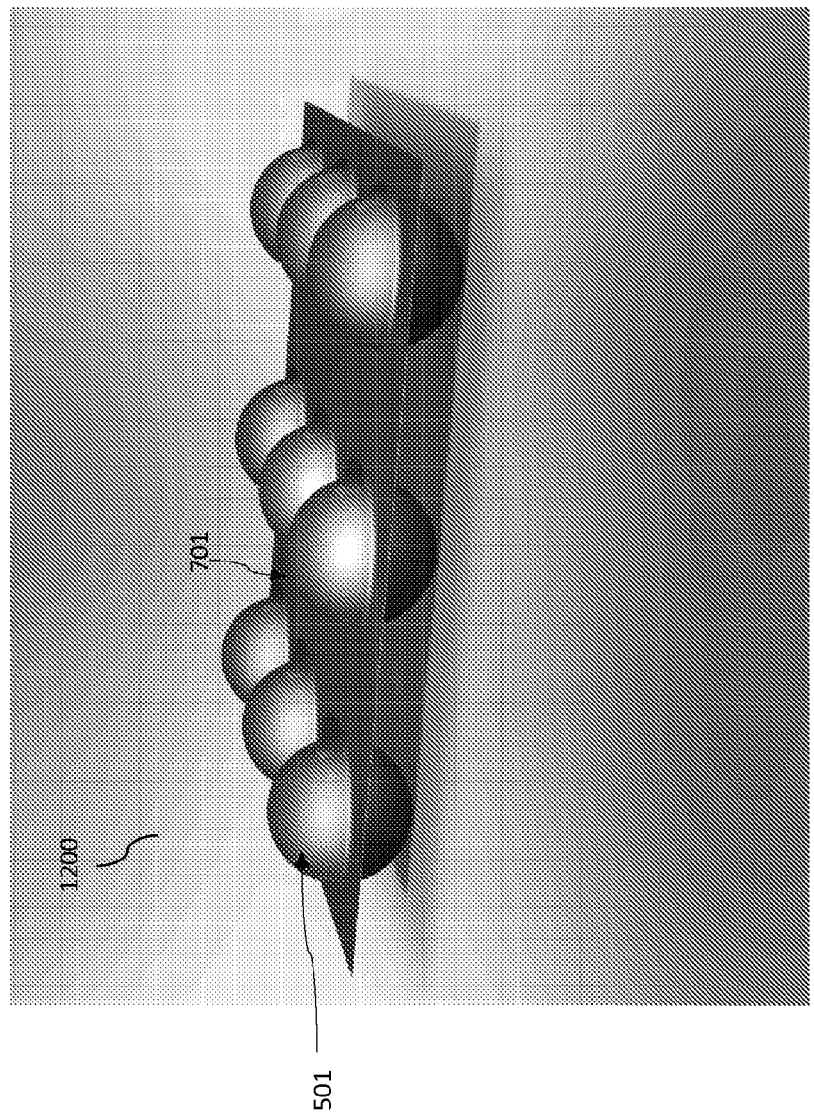
FIG. 14 depicts a different illustration of the embodiment of the present invention shown in FIG. 12.

In the illustration depicted in FIG. 12, the conditions are shown to have resulted in cells 702 being on both sides of the encapsulated micro-bubble material 1200. Stated otherwise, sheet 701 does not remain flat after the removal of substrate 200, which results in "two-sided encapsulated micro-bubble" material 1200. Each of FIGS. 13-14 depicts a different illustration of the embodiment of the present invention shown in FIG. 12.

Figure 15:
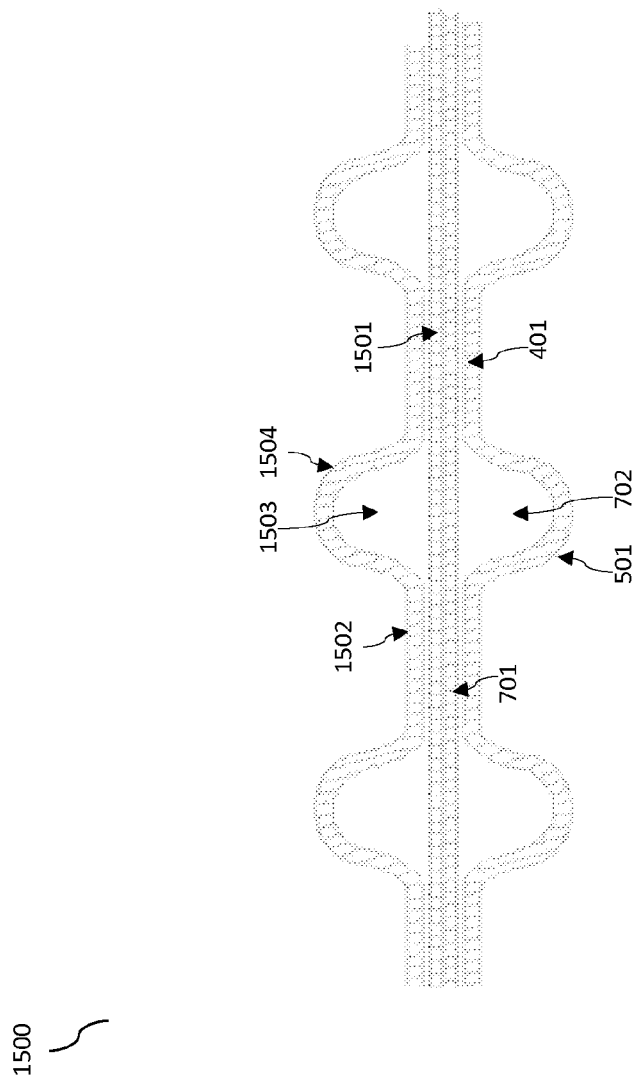
FIG. 15 depicts a side view of an embodiment of the present invention in which two one-sided encapsulated micro-bubble materials shown in FIG. 9 are positioned back to back.

Optionally, the bubble material can be layered. For example, two one-sided encapsulated micro-bubble materials can be positioned back to back, such as shown in FIG. 15. As shown in FIG. 15, flat graphene sheet 701 of the encapsulated micro-bubble material 900 (shown in FIG. 9) is taken and put in contact with a flat graphene sheet 1501 of a second one-sided encapsulated micro-bubble material. As shown in FIG. 15, the cells 702 are aligned with the cells 1503 of the second one-sided encapsulated micro-bubble material. However, the second one-sided encapsulated micro-bubble material can be positioned otherwise such that the cells are not in alignment.

Figure 16:
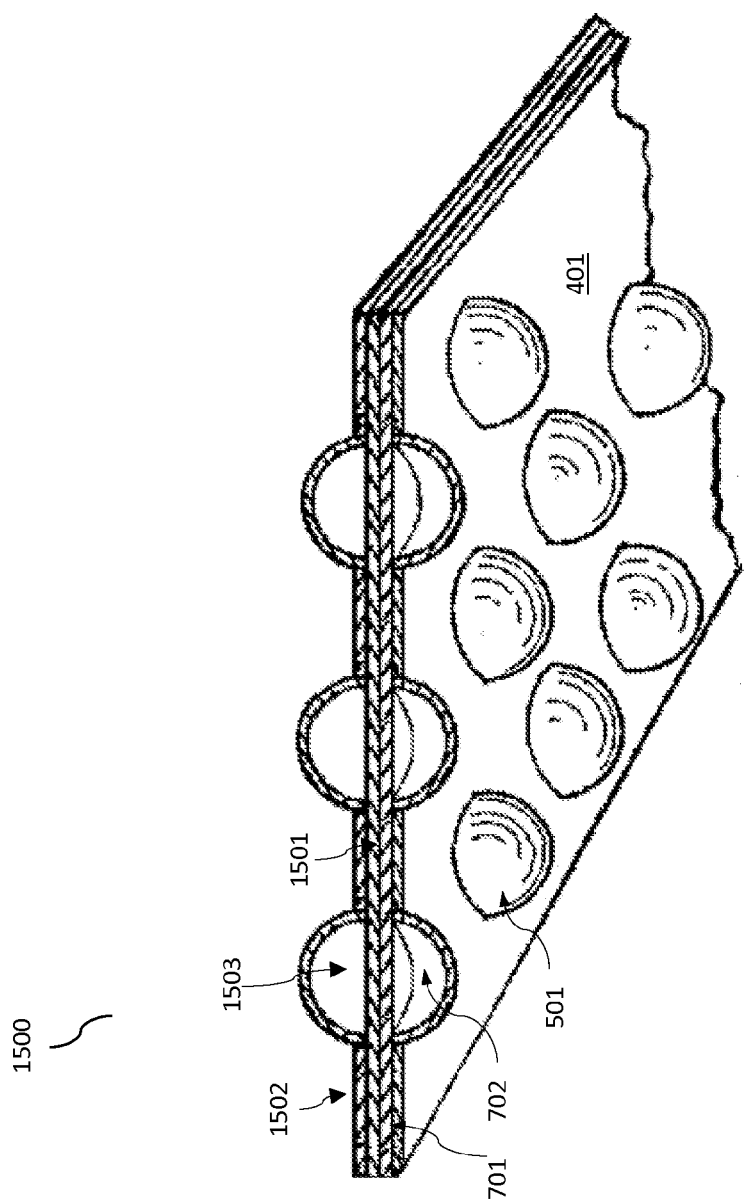
FIG. 16 depicts a different illustration of the embodiment of the present invention shown in FIG. 15.
Figure 17:
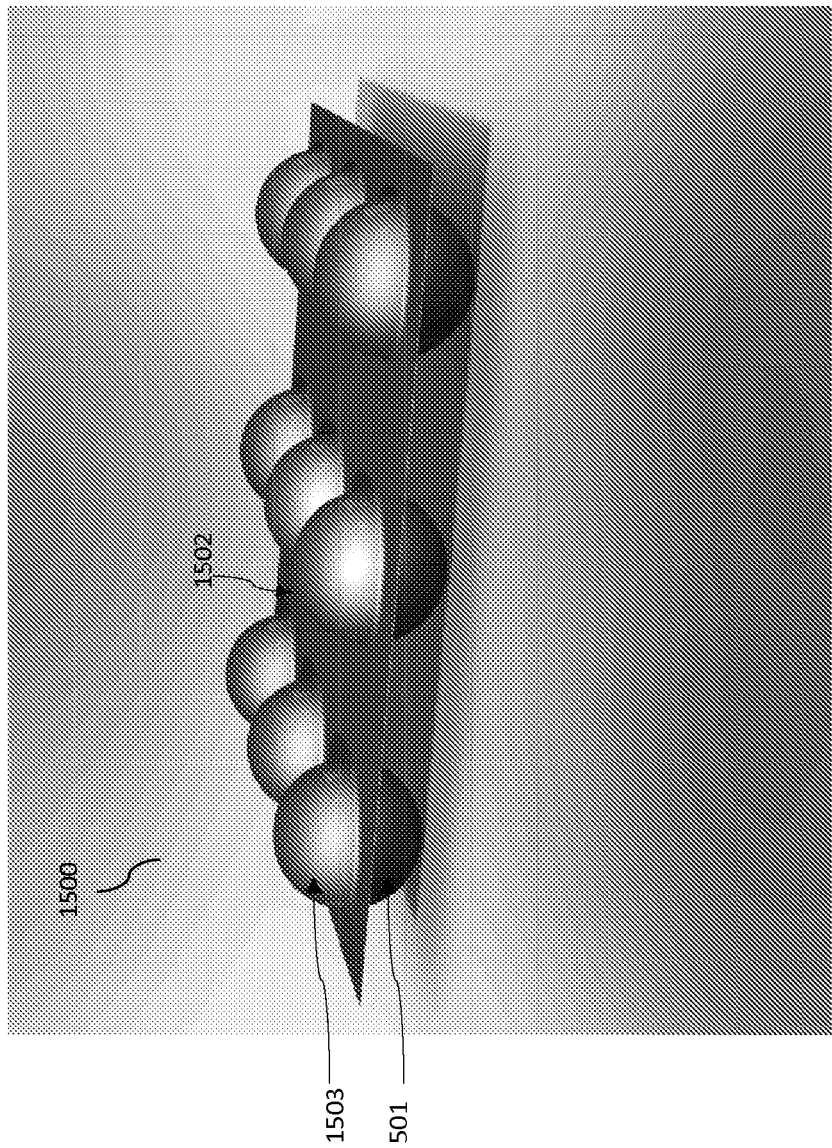
FIG. 17 depicts a different illustration of the embodiment of the present invention shown in FIG. 15.

Once graphene sheet 701 and 1501 are contacted, they should remain so due to Van der Waals forces. By this arrangement, the sides with the cells (sheets 401 and 1502 are positioned outwards such that bowls 501 and 1504 protrude outward. This results in a composite encapsulated micro-bubble material that appears to be a two-sided encapsulated micro-bubble material. Each of FIGS. 16-17 depicts a different illustration of the embodiment of the present invention shown in FIG. 15.

Since sheets 401 and 1502 can be made of different materials (i.e., sheet 401 could be graphene while sheet 1502 could graphene oxide), a composite two-sided encapsulated micro-bubble material can be formed that has cells of one material on one side, and cells of a different material on the other.

Furthermore, the encapsulated micro-bubble material can optionally be layered front to front, or back to front.

Figure 18:
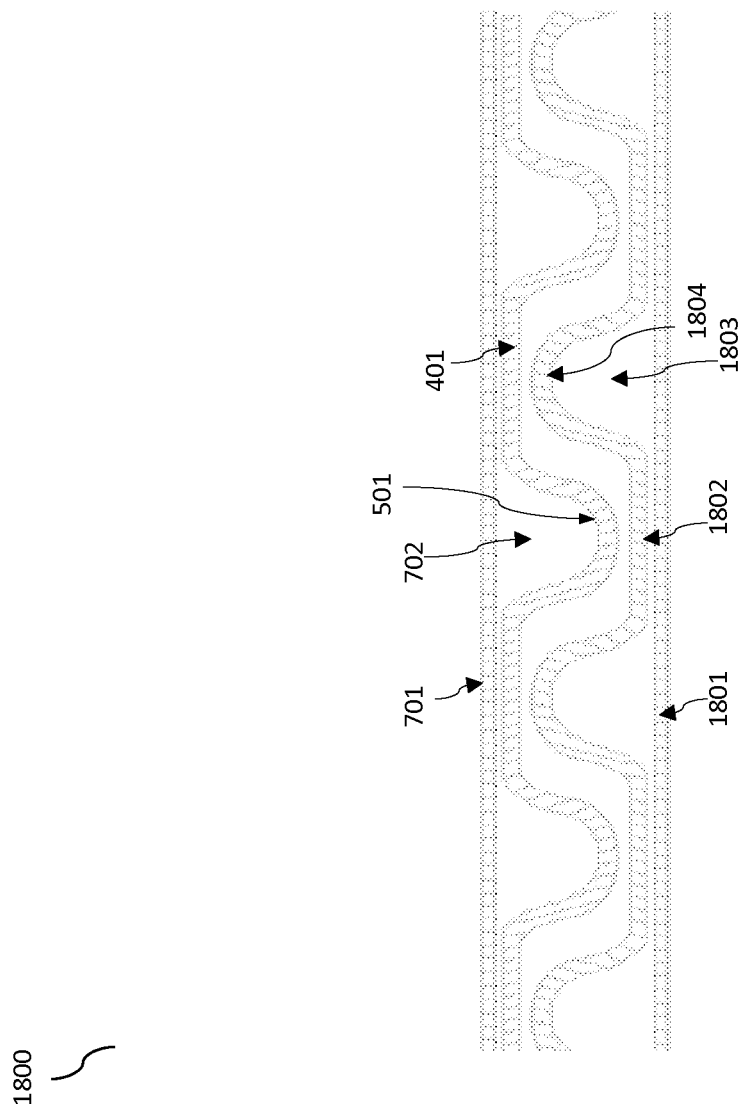
FIG. 18 depicts a side view an embodiment of the present invention in which two one-sided encapsulated micro-bubble materials shown in FIG. 9 are offset and positioned front to front.
Figure 19:
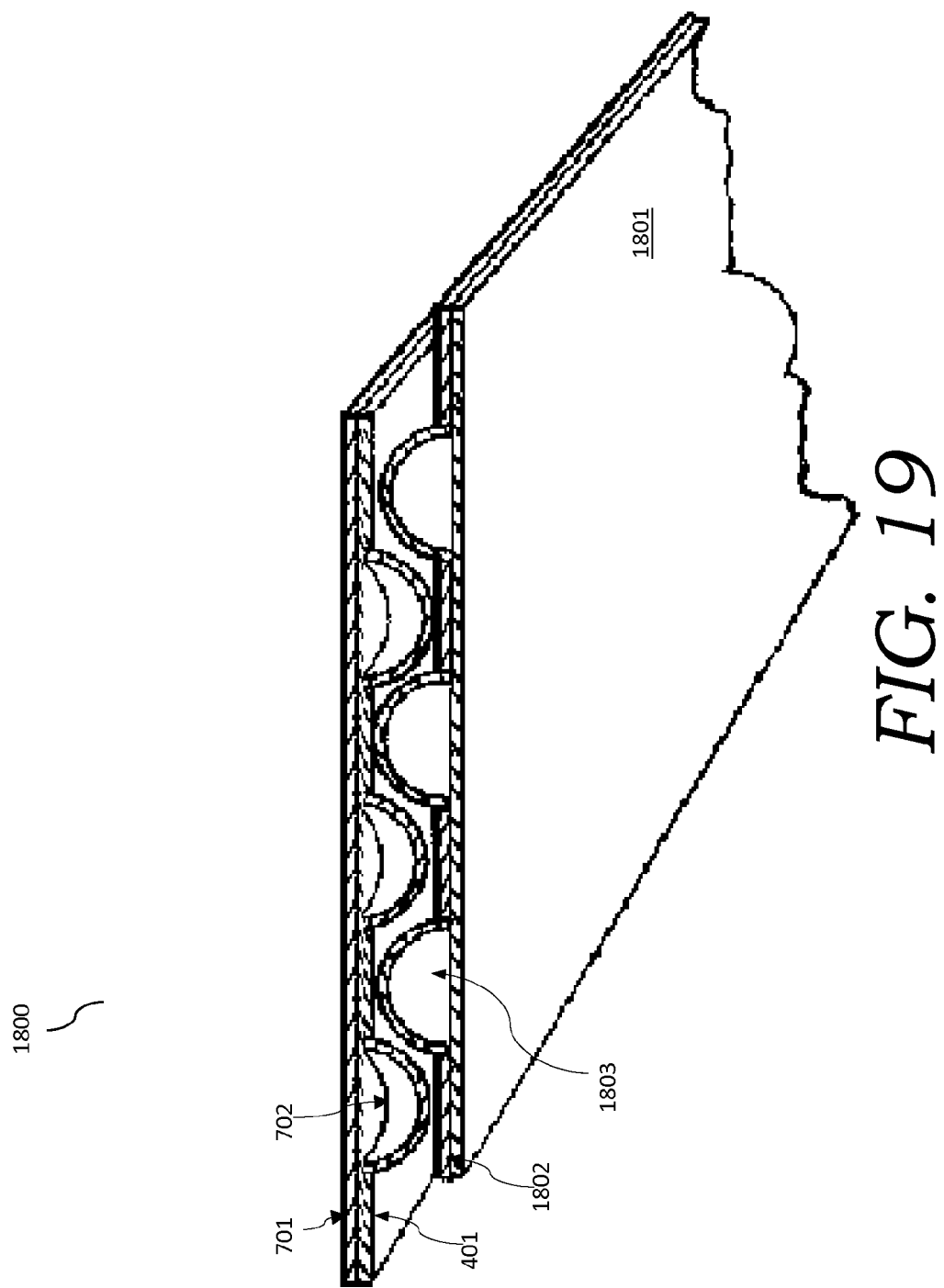
FIG. 19 depicts a different illustration of the embodiment of the present invention shown in FIG. 18.
Figure 20:
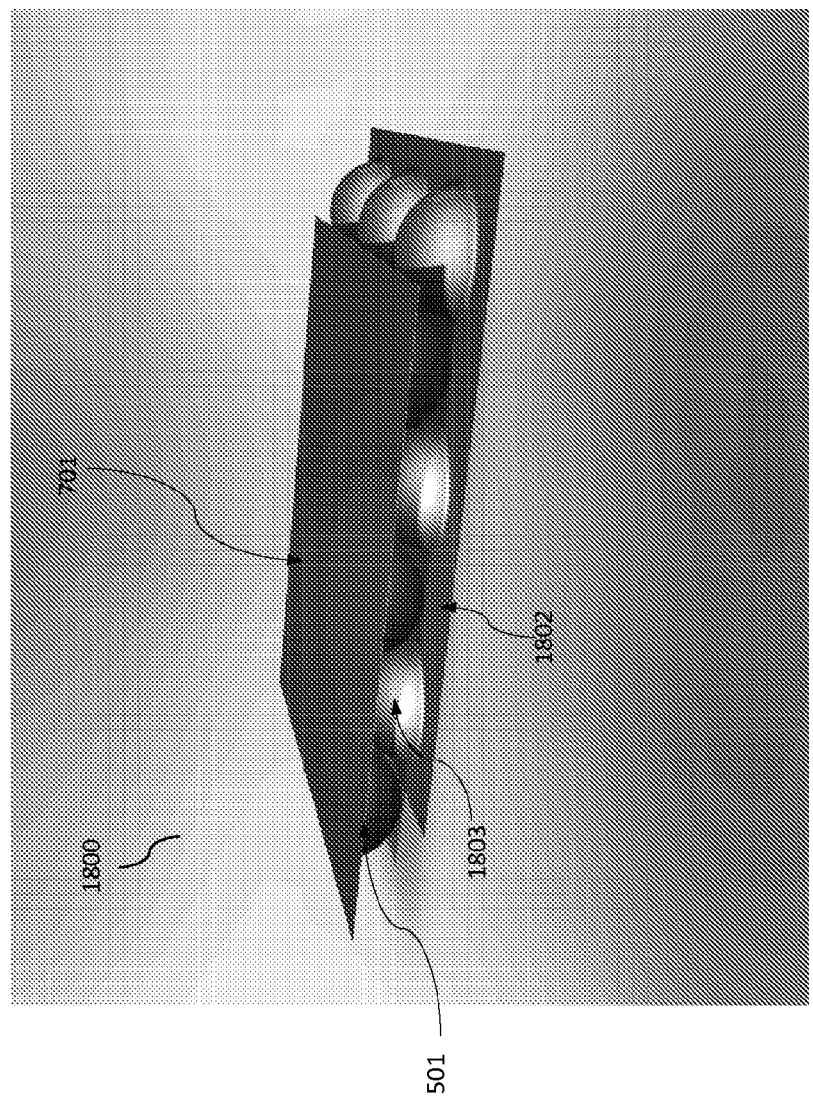
FIG. 20 depicts a different illustration of the embodiment of the present invention shown in FIG. 18.

FIG. 18 depicts a side view an embodiment of the present invention in which two one-sided encapsulated micro-bubble materials shown in FIG. 9 are offset and positioned front to front. As shown in FIG. 18, cells 702 are offset with the cells 1803 of the second one-sided encapsulated micro-bubble material. The bowls 501 and 1804 can come in contact with the sheets 1802 and 402, respectively. Flat sheets 701 and 1801 are positioned to face exteriorly. FIG. 18 shows the cells interlocking that will help prevent sliding motions between layers. Each of FIGS. 19-20 depicts a different illustration of the embodiment of the present invention shown in FIG. 18.

Figure 21:
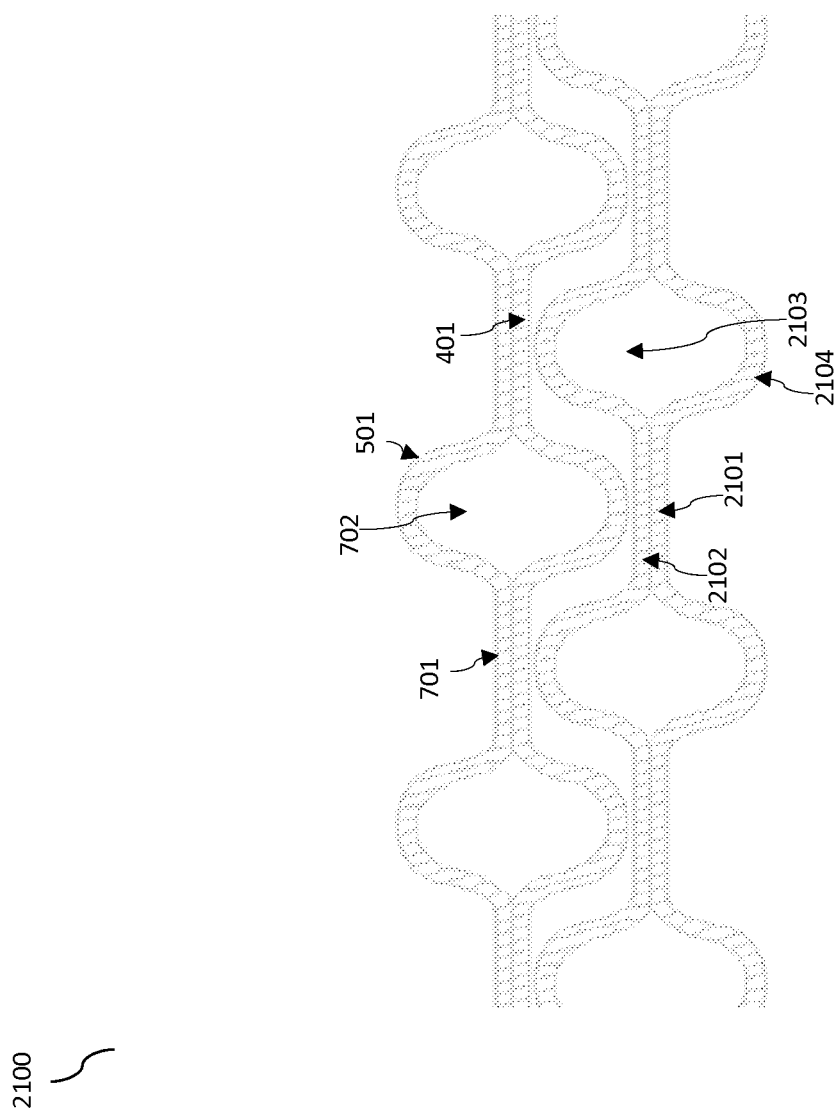
FIG. 21 depicts a side view an embodiment of the present invention in which two two-sided encapsulated micro-bubble materials shown in FIG. 12 are offset and positioned together.
Figure 22:
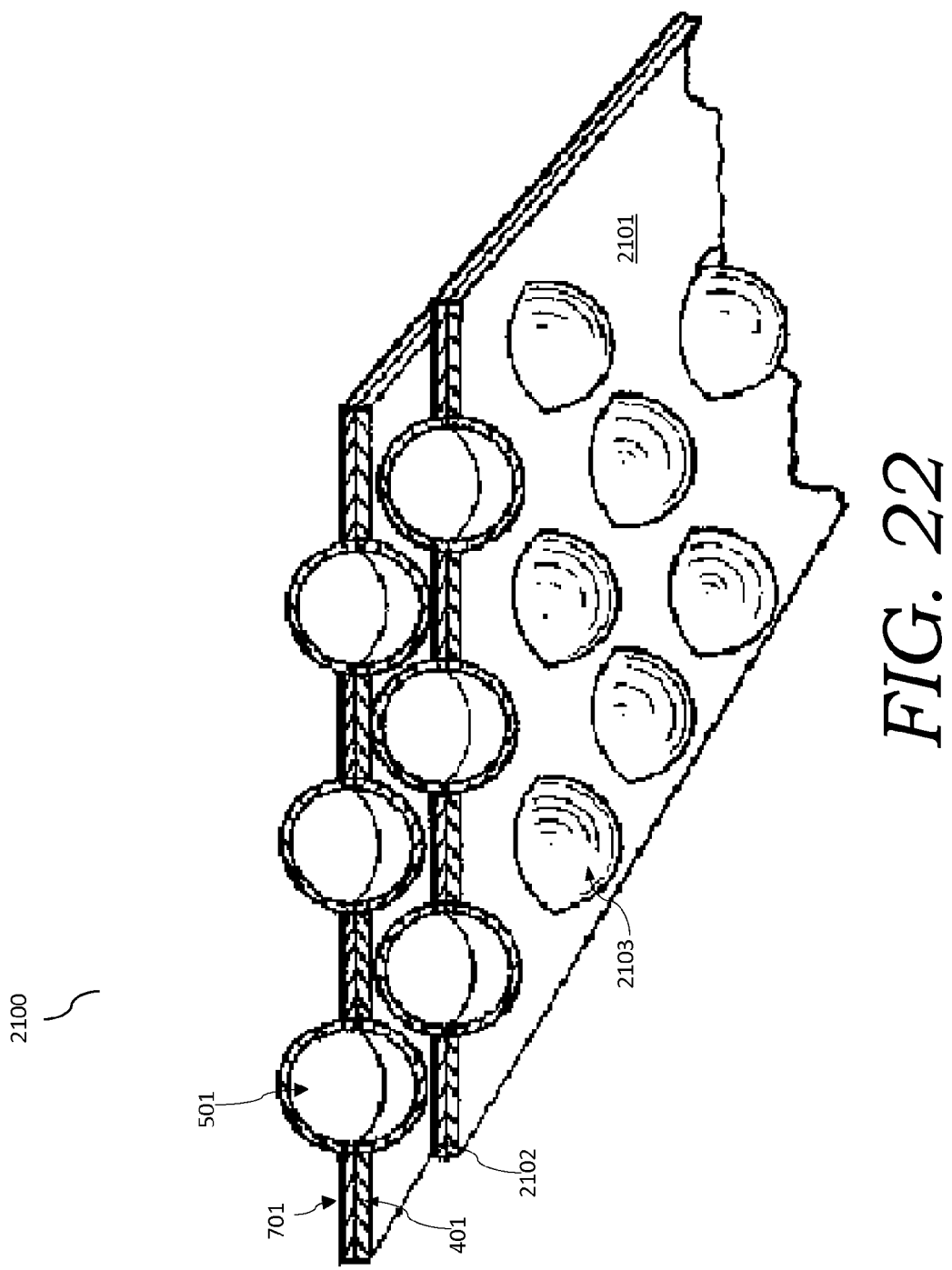
FIG. 22 depicts a different illustration of the embodiment of the present invention shown in FIG. 21.

This same arrangement can be utilized to layer two two-sided encapsulated micro-bubble materials together. FIG. 21 depicts a side view an embodiment of the present invention in which two two-sided encapsulated micro-bubble materials shown in FIG. 12 are offset and positioned together. As shown in FIG. 21, cells 702 are offset with the cells 2103 of the second two-sided encapsulated micro-bubble material. The bowls 501 and 2104 (that are on the sides facing one another, sheets 401 and 2102 as shown in FIG. 12) can come in contact with the sheets 2102 and 402, respectively. Flat sheets 701 and 2101 are positioned to face exteriorly. Like FIG. 18, FIG. 21 shows the cells interlocking that will help prevent sliding motions between layers. FIG. 22 depicts a different illustration of the embodiment of the present invention shown in FIG. 21.

By layering of same or different encapsulated micro-bubble materials, a structure of macroscopic thickness can be created. For example, it would take about 25 forty-micron tall layers to reach a thickness of 1 mm.

The encapsulated micro-bubble material can be designed to take advantage of the unique properties of the material used in it. Moreover, by these cells, compressive loads will compress the gas inside the cells. Due to the high strength of the materials (such as graphene, which is around 200 times stronger than steel), the cells can take extremely high compressive forces before bursting. Tensile loads will be resisted by the Van der Waals forces between layers of by the material properties of the graphene itself (or other materials utilized)

Figure 23:
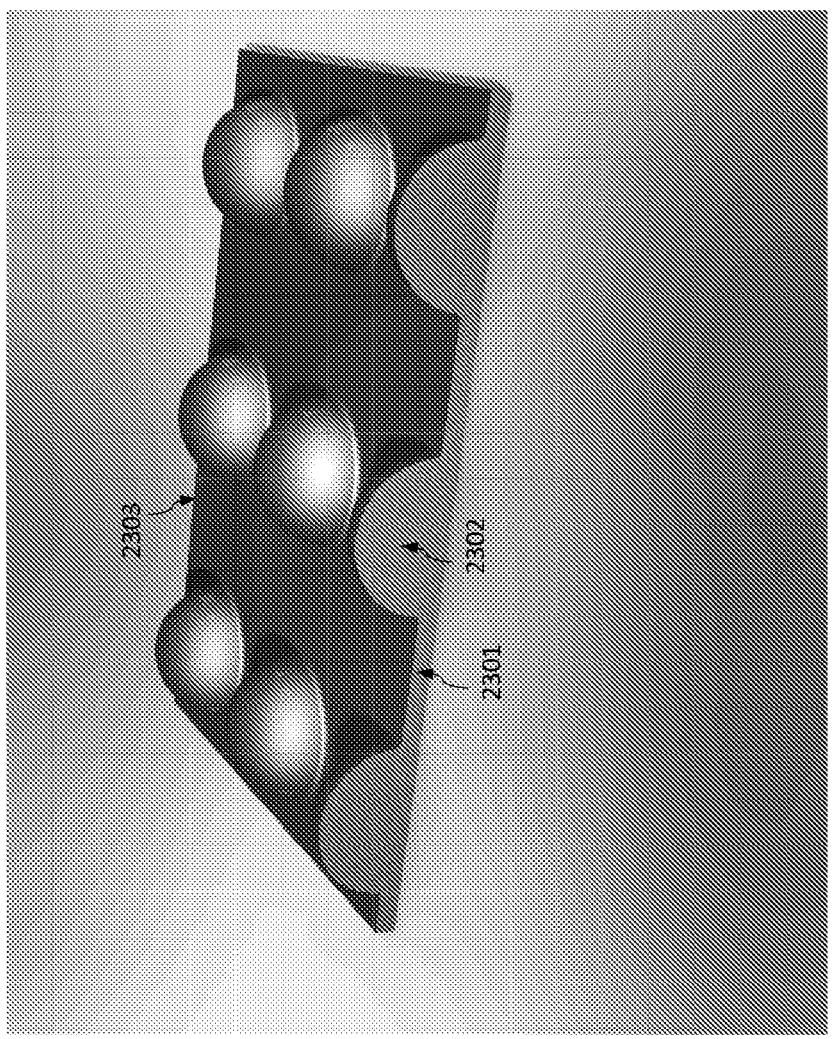
FIG. 23 depicts an alternative substrate that can be use to form the graphene used when making an embodiment of the present invention.

FIG. 23 depicts an alternative substrate that can be use to form the graphene used when making an embodiment of the present invention. This substrate 2301 has protrusions 2302. While the protrusions are shown to be semi-spherical in shape; however any shape can be utilized. Graphene can be grown on this substrate 2301 to form a graphene sheet 2303 having protrusions. This graphene sheet 2303 can then be utilized to make encapsulated micro-bubble material. For example, the graphene layer 2303 can be aligned with the substrate 200 such that the protrusions are positioned in the wells 204. This can affect the different pressures being needed for the cells. Or, graphene layer 2303 can be used as the graphene sheet 701, and aligned such to facilitate the formation of two-sided encapsulated micro-bubble material at conditions that would otherwise have resulted in one-sided encapsulated micro-bubble material. Again, forming layers of two-sided encapsulated micro-bubble material facilitates the interlocking of layers of encapsulated micro-bubble material while still affording the bubbles to be exteriorly faced (including for possible interlocking with additional layers of encapsulated micro-bubble materials).

Figure 24:
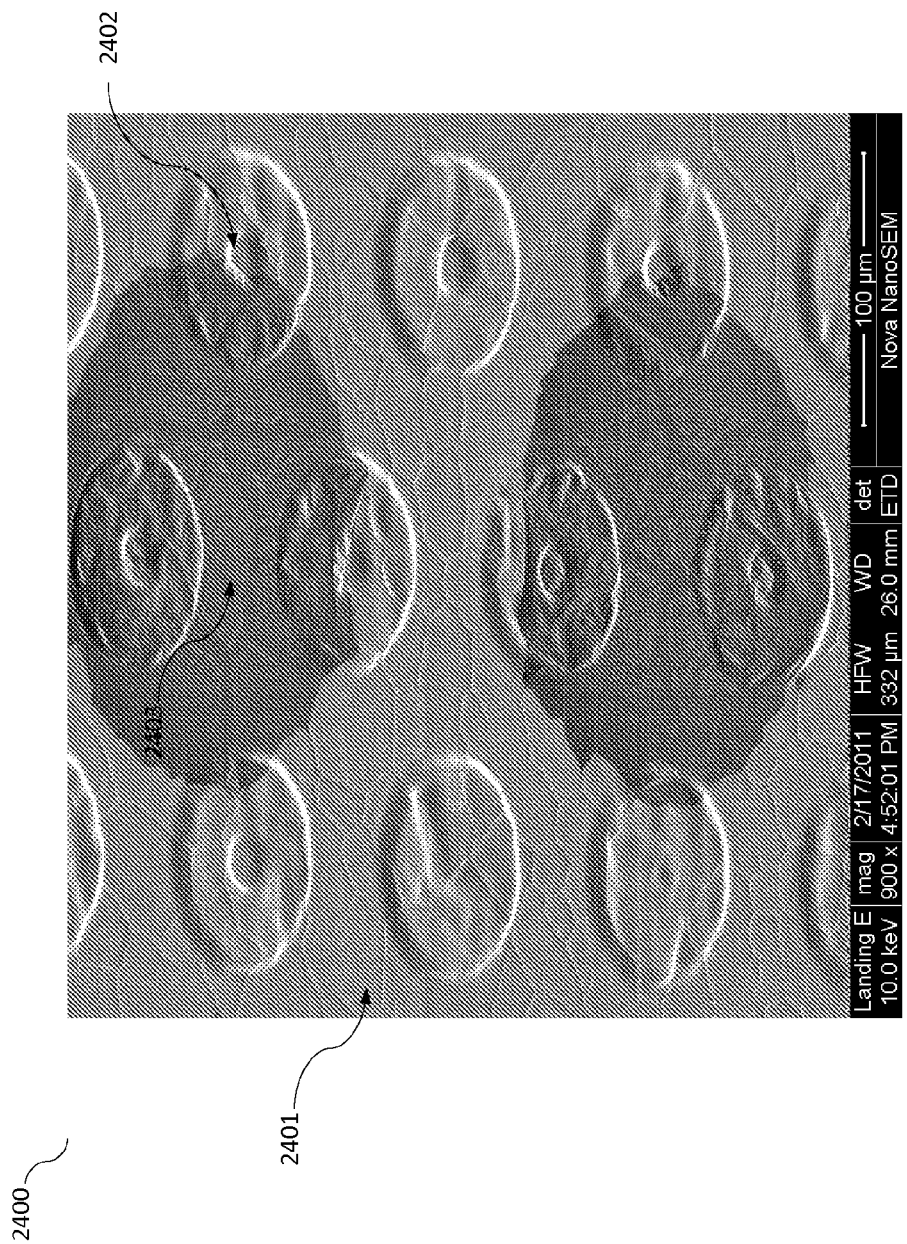
FIG. 24 is an SEM image of a copper-graphene sheet having open 3D features from which encapsulated micro-bubble material of the present invention can be formed.

FIG. 24 is an SEM image of a copper-graphene sheet 2400 having open 3D features from which encapsulated micro-bubble material can be formed. In FIG. 24, a copper-graphene sheet 2400 is seen having two darker circular areas 2403 (which are open 3D features) from which encapsulated micro-bubble material of the present invention can be.

Copper-graphene sheet 2400 shown in FIG. 24 was made as follows: depressions 2402 (such as depressions that look like bunt cakes) were etched into copper foil. Graphene was then grown on the copper foil. Thereafter, a few nm layer of metal 2401 was deposited on top of the graphene side. The copper foil side was then back etched to expose graphene and to create the open features. Because the layer of metal 2401 and graphene are thin (and thus opaque), the back-etching of the copper foil side (which, from the orientation of FIG. 24 is below) are visible and are seen in FIG. 24 as the darker circular areas 2403.

Figure 25:
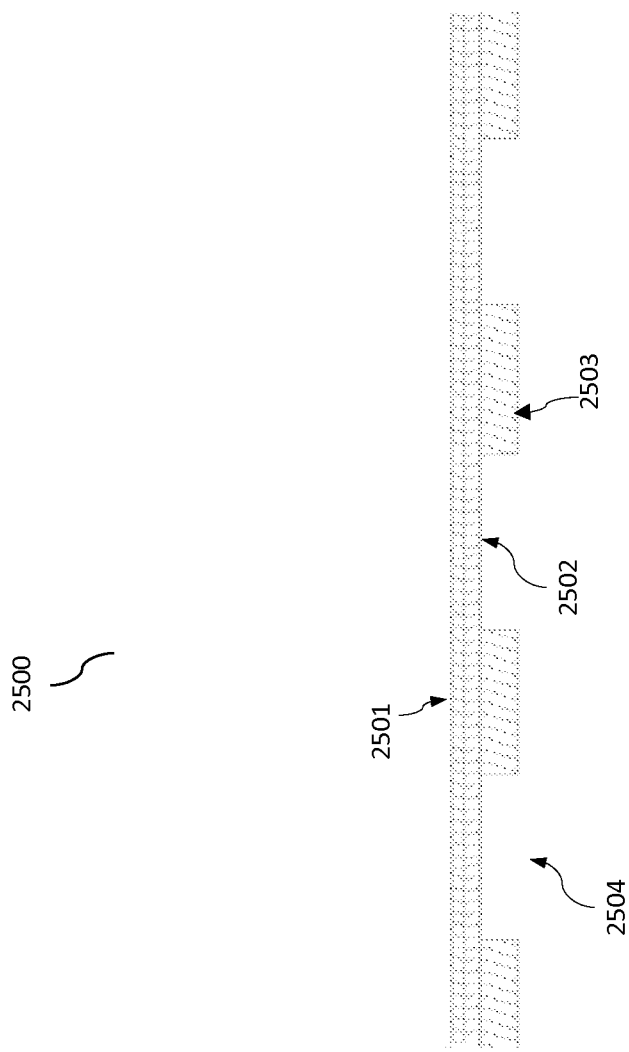
FIG. 25 depicts a side view a copper-graphene sheet having open 3D features from which encapsulated micro-bubble material of the present invention can be formed.

FIG. 25 depicts a side view a copper-graphene sheet 2500 having open 3D features from which encapsulated micro-bubble material can be formed. The copper-graphene sheet 2500 includes a thin layer of metal 2501 (such as copper), graphene 2502, and a copper foil 2503. The copper foil 2503 has open features 2504, which can be made by back etching or an alternative process to expose the graphene 2502. Alternatively foils of other metals can be utilized to form a different metal-graphene sheet.

Figure 26:
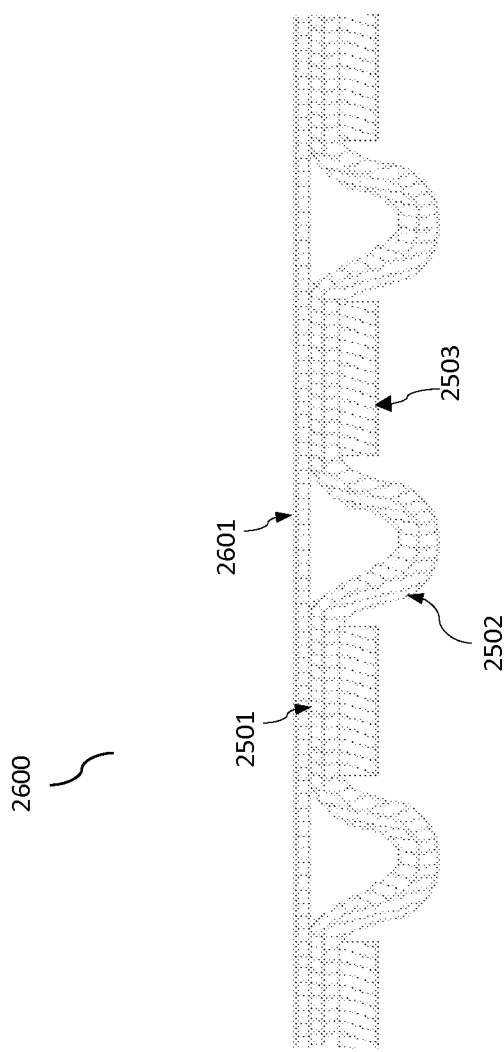
FIG. 26 depicts a side view an embodiment of the present invention that could be formed from the copper-graphene sheet shown in FIG. 25.

As shown in FIG. 26, another graphene sheet 2601 can be transferred on top of copper-graphene sheet 2500 (on the side having thin layer of metal 2501), which would capture gas between the copper-graphene sheet 2500 and graphene sheet 2601 and form encapsulated micro-bubble material 2600. Such method generally will result in heavier encapsulated micro-bubble material, as compared with methods that do not use a copper (or other metal) foils and metal layers.

In some embodiments of the present invention, protrusions on the surface of the copper-graphene sheet can be etched and coated with metal such that they collapse to a small point, creating a large array of free-standing field emission sources that may be used in a variety of applications, including displays.

Figure 27:
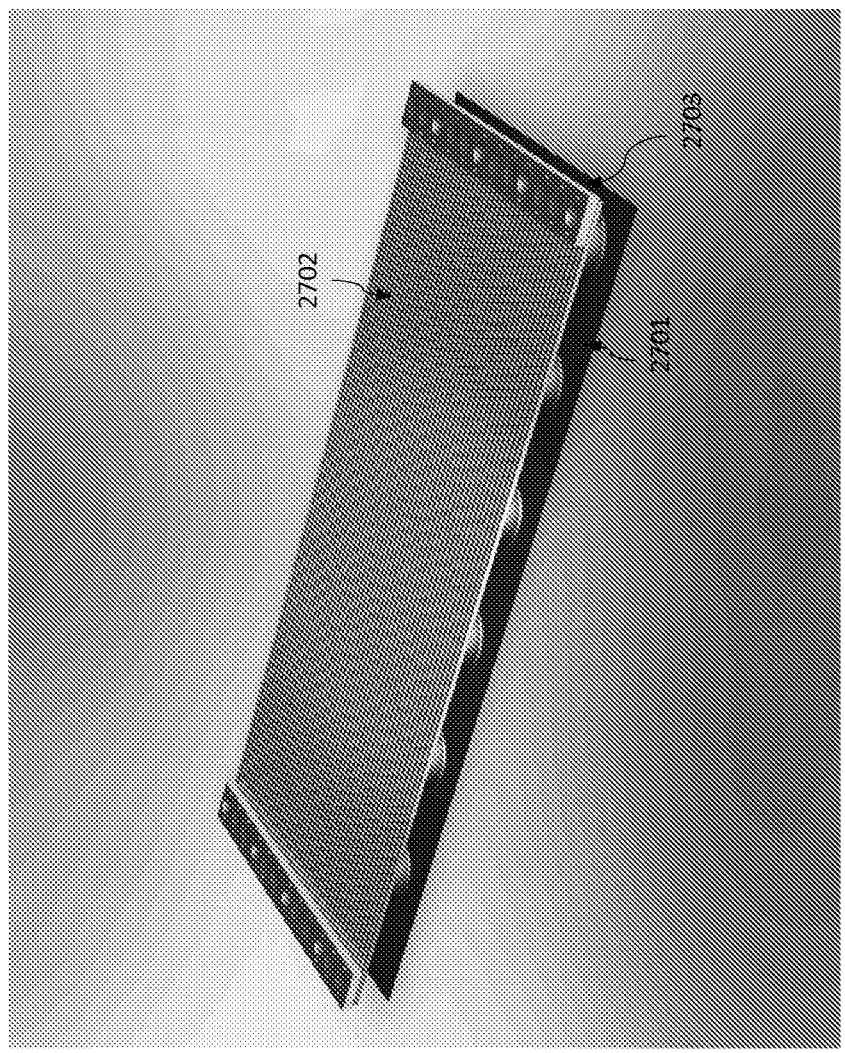
FIG. 27 depicts device of the present invention utilizing graphene encapsulated micro-bubble material.

The encapsulated micro-bubble materials can be used in devices to take advantage of their unique electrical and thermal properties, as well as their strength. For instance, FIG. 27 shows how the graphene encapsulated micro-bubble material 2701 can be combined with thin film solar cells 2702, electronics (not shown), small batteries/ultra-capacitors (not shown) and graphene membrane pumps 2703 (such as, for example, disclosed and taught in co-owned PCT Patent Appl. Publ. No. WO 2010/039983, published Apr. 4, 2010, (PCT Patent Appl. No. PCT/US09/59266, filed Oct. 1, 2009) (Pinkerton) and PCT Patent Application No. PCT/US2011/023618 (Pinkerton), filed Feb. 3, 2011) to create a lighter than air vehicle that does not need fuel to hover or move indefinitely.

Figure 28:
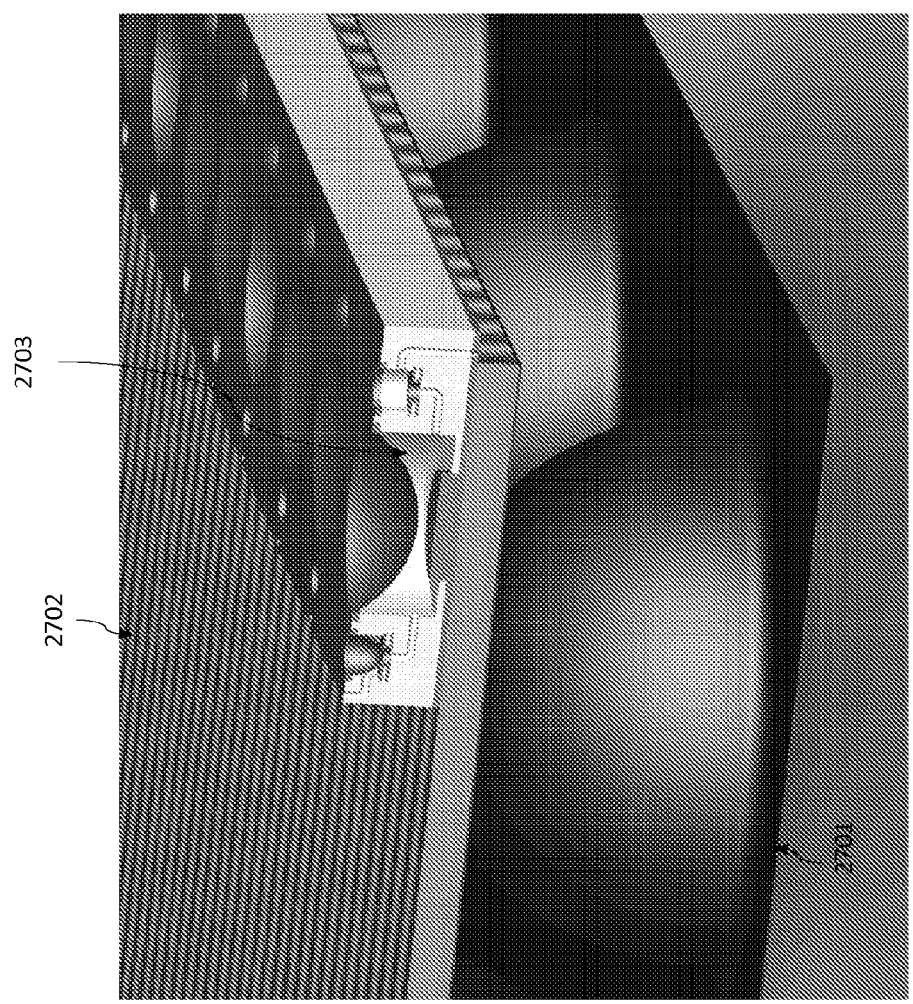
FIG. 28 depicts a magnified view of a portion of the device shown in FIG. 27.

FIG. 28 depicts a magnified view of a portion of the graphene membrane pumps shown in FIG. 27.

Such a system would also be very quiet given the ultrasonic operation of graphene pumps. In addition to propulsion, the graphene membrane pumps/valves can be used to compress air in small chambers for ballast to maintain an altitude without expending power (to hover in the dark, when solar power is unavailable). Water or other fluids could also be used as ballast that could be ejected as needed. Batteries or other energy storage systems could propel the graphene encapsulated micro-bubble material vehicle at night (power requirements would be small since the system can be thin (allowing the vehicle to have low wind resistance), can hover without using energy and make use of wind currents by constantly adjusting its angle relative to the wind with its onboard membrane pumps).

Such a structure could be used as a mobile cell tower, to transport items between locations or as a mobile solar cell farm (when tethered with electrical cable to the grid or used in conjunction with onboard battery). The system might also be used to convert water to compressed hydrogen (using solar cells) which would then be transported without emissions to the fuel's point of use. An array of tethered graphene encapsulated micro-bubble material device systems could be used to convert both wind and solar energy by constantly adjusting their angle relative to the wind to create oscillating forces on the tether (the tether could be electrically conductive to transport solar output), which can then be converted to useable energy using a variety of existing conversion systems (electromagnetic, piezoelectric, etc.).

Figure 29:
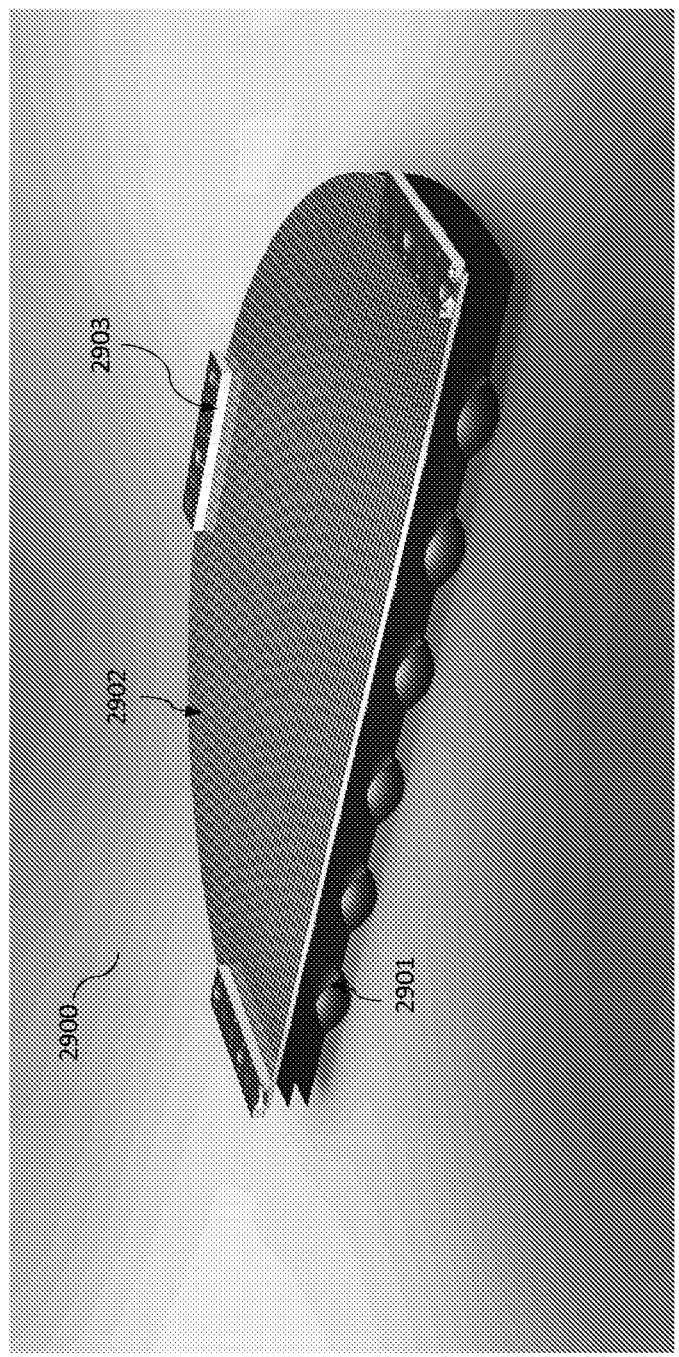
FIG. 29 depicts a solar-wind module device of the present invention utilizing graphene encapsulated micro-bubble material.

FIG. 29 depicts a solar-wind module 2900 that is disk shaped (i.e., the array of thin film solar cells 2902 are disk shaped) and has graphene encapsulated micro-bubble material 2901, and graphene membrane pumps 2903. Such a disk shape may be built upon on a Si wafer.

Figure 30:
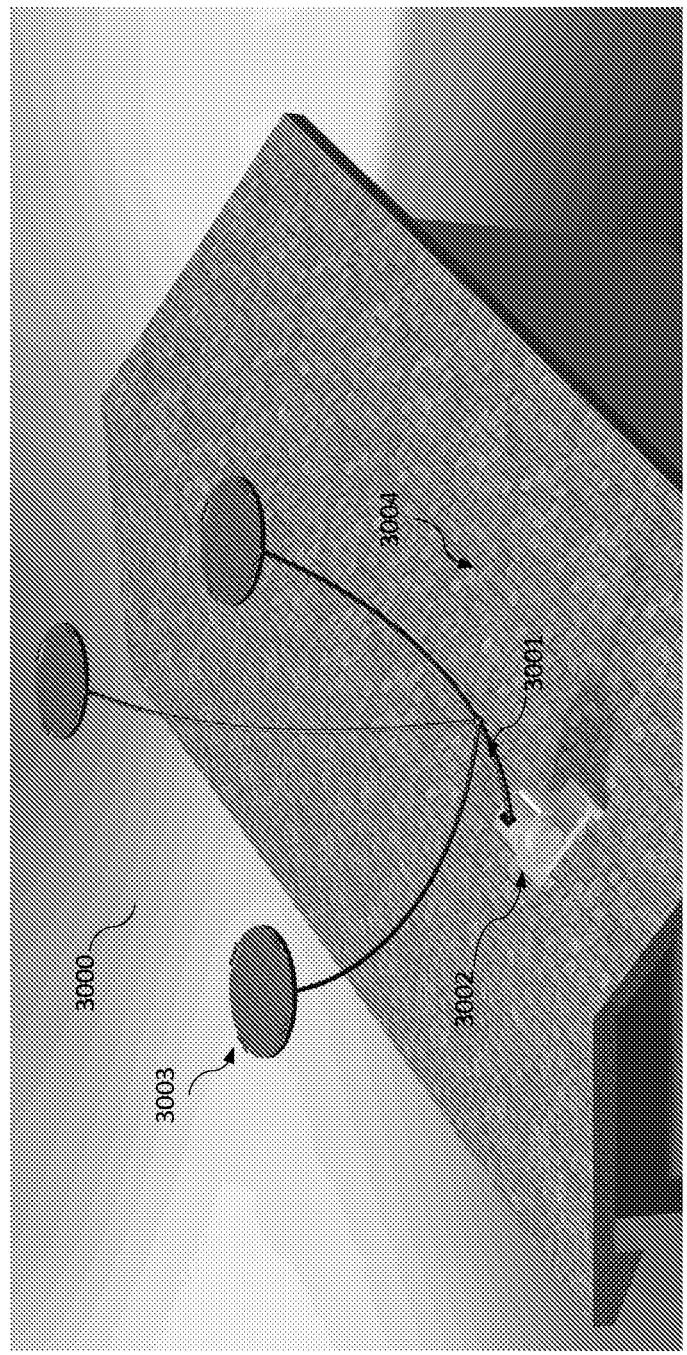
FIG. 30 depicts a roof mounted device of the present invention utilizing graphene encapsulated micro-bubble material.
Figure 31:
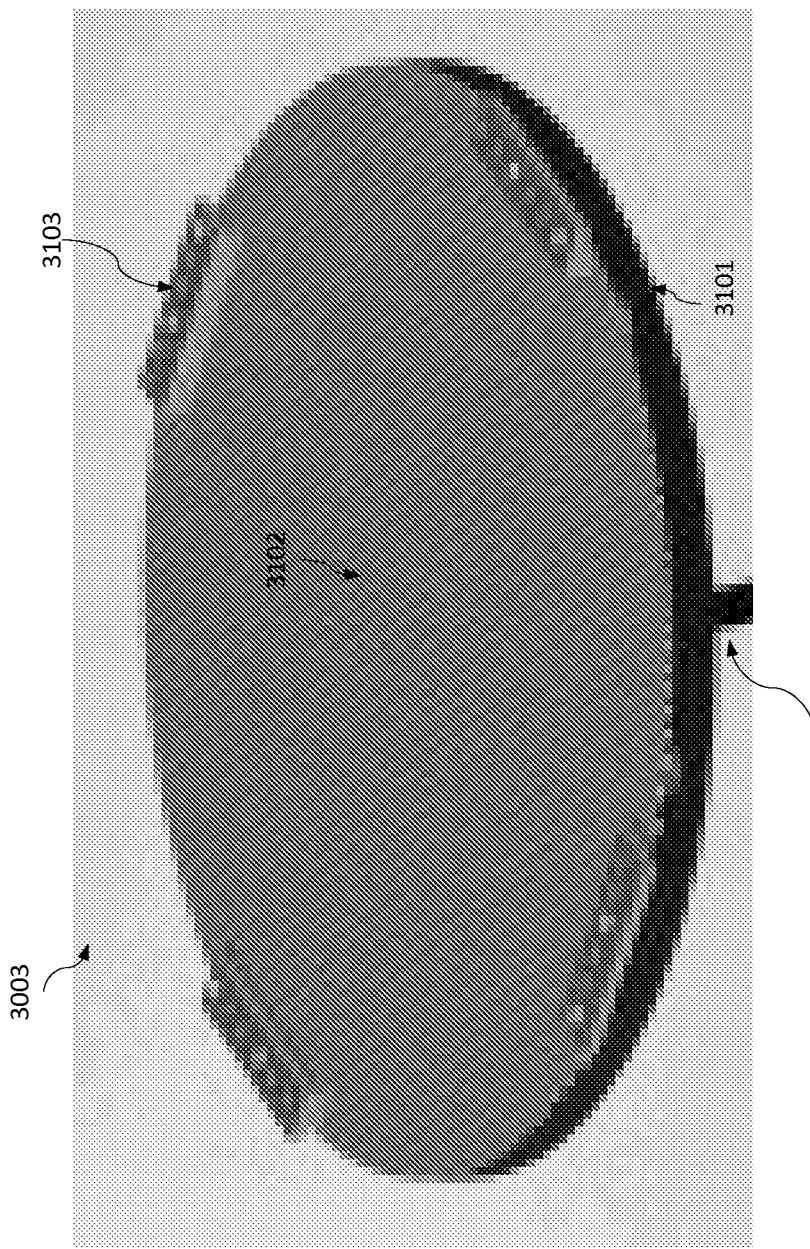
FIG. 31 depicts a magnified view of a disk of the roof mounted device shown in FIG. 30.

FIG. 30 depicts a unit 3000 mounted on a roof 3004 that can accept solar output through cables 3001 and that can also be used to convert wind energy by letting the cables (which are connected through a pulley 3002 to an electrical generator (not shown)) in and out (like the way the string of a kite is let out and reeled back in). As the cable 3001 is being let out (so the disks 3003 move away from the roof) the disks are angled to maximize the pulling force and turn the generator. As depicted in FIG. 30, disks 3003 are circular in shape. However, alternative shapes can be utilized. As shown in FIG. 31 (which shows a magnified view of one of disks 3003), disk 3003 includes thin film solar cells 3102, graphene encapsulated micro-bubble material 3101, and graphene membrane pumps 3103. When the cable 3001 is reeled back in the disks 3003 are angled to minimize the pulling force (the generator and pulley 3002 can then be used as a motor to pull in the cable 3001). There is a net electrical output from the wind because the force pulling the cable 3001 out would be much higher than the force reeling the cable 3001 back in.

Sensors, controllers and software can be used to maximize the combined solar and wind output for a given set of conditions. For instance, when it is a sunny day with no wind, the cable would remain fixed and the disks would find the optimal angle toward the sun. And, when it is a cloudy, windy day, the unit would give priority to wind energy production. At night, the unit would be set up to maximize wind energy production.

As shown in FIG. 30, there is very little space of roof 3004 required for the installation and the total area of disks 3003 need not be limited by the area of the roof. Also, no large/expensive structures would be required to hold the disks 3003 in place and adjust their angle.

Embodiments of the present invention can also be used in high temperature applications in view of its heat resistance properties. As noted above, the use of graphene or other atomically thin material affords embodiments to generally able to withstand temperatures up to about 750° C. If the gas utilized when making the encapsulated micro-bubble material is oxygen-free (such as helium, nitrogen, or other inert gas), the external surface of the encapsulated micro-bubble material structure (such as a graphene encapsulated micro-bubble material) can be coated with a high temperature material that is stable in oxygen (such as titanium-nitride). The resulting coated graphene encapsulated micro-bubble material could withstand much higher temperatures (something on the order of 3000° C.). This coated graphene encapsulated micro-bubble material would be useful in various parts of engines (such as in jets, rockets, automobiles, etc.).

A number of embodiments of the invention have been described. Nevertheless, it will be understood that various modifications may be made without departing from the spirit and scope of the invention. Accordingly, other embodiments are within the scope of the following claims.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. For example, graphene-drum pumps and engines can be layered or stacked (for instance, vertically) to increase output. Also, the graphene drums can be shapes other than circles such as squares or rectangles (i.e., the use of the term "drums" does not limit the shape). Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. An encapsulated micro-bubble material comprising:
   (a) a first sheet comprising one or more layers of a first atomically thin material, wherein the first sheet has a first side;
   (b) a second sheet comprising one or more layers of a second atomically thin material, wherein
      (i) the second sheet has a first side,
      (ii) a first portion of the first side of the first sheet is in direct contact with a first portion of the first side of the second sheet, and
      (iii) a second portion of the first side of the first sheet is not in direct contact with a second portion of the first side of the second sheet; and
   (c) an array of sealed three-dimensional cells positioned between the first side of the first sheet and the first side of the second sheet, wherein
      (i) the boundary of the sealed three-dimensional cells comprise the second portion of the first side of the first sheet and the second portion of the first side of the second sheet, and
      (ii) a gas is contained within the array of sealed three-dimensional cells.

2. The encapsulated micro-bubble material of claim 1, wherein
   (a) the first atomically thin material is selected from the group consisting of graphene, graphene oxide, graphene/graphene oxide, and combinations thereof; and
   (b) the second atomically thin material is selected from the group consisting of graphene, graphene oxide, graphene/graphene oxide, and combinations thereof.

3. The encapsulated micro-bubble material of claim 1, wherein
   (a) the first atomically thin material is graphene; and
   (b) the second atomically thin material is graphene.

4. The encapsulated micro-bubble material of claim 1, wherein
   (a) the first sheet further comprises a metal foil;
   (b) a first side of the first sheet is the atomically thin material; and
   (c) a second side of the first sheet is the metal foil having portions through which the atomically thin material from the first side of the sheet is exposed.

5. The encapsulated micro-bubble material of claim 1, wherein the gas comprises helium.

6. The encapsulated micro-bubble material of claim 1, wherein the encapsulated micro-bubble material can float in air at room temperature and pressure.

7. The encapsulated micro-bubble material of claim 1, wherein the closed three-dimensional features have an average size of at most about 1000 μm.

8. The encapsulated micro-bubble material of claim 1, wherein the closed three-dimensional features have an average size between about 10 μm and about 100 μm.

9. An assembly comprising an encapsulated micro-bubble material, wherein the encapsulated micro-bubble material comprises:
   (a) a first sheet comprising one or more layers of a first atomically thin material, wherein the first sheet has a first side;
   (b) a second sheet comprising one or more layers of a second atomically thin material, wherein
      (i) the second sheet has a first side,
      (ii) a first portion of the first side of the first sheet is in direct contact with a first portion of the first side of the second sheet, and
      (iii) a second portion of the first side of the first sheet is not in direct contact with a second portion of the first side of the second sheet; and
   (c) an array of sealed three-dimensional cells positioned between the first side of the first sheet and the first side of the second sheet, wherein
      (i) the boundary of the sealed three-dimensional cells comprise the second portion of the first side of the first sheet and the second portion of the first side of the second sheet, and
      (ii) a gas is contained within the array of sealed three-dimensional cells; wherein
   (d) the assembly is a mobile assembly; and
   (e) the assembly further comprises an array of pumps.

10. The assembly of claim 9, wherein the array of pumps is an array of membrane pumps.

11. The assembly of claim 10, wherein the membrane pumps are graphene membrane pumps.

12. The assembly of claim 9 further comprising a solar cell.

13. The assembly of claim 9 further comprising a battery.

14. The assembly of claim 9 further comprising a microprocessor, a solar cell, a battery, a global positioning device, and a wireless communications device.

15. An assembly comprising an encapsulated micro-bubble material, wherein the encapsulated micro-bubble material comprises:
(a) a first sheet comprising one or more layers of a first atomically thin material, wherein the first sheet has a first side;
(b) a second sheet comprising one or more layers of a second atomically thin material, wherein
 (i) the second sheet has a first side,
 (ii) a first portion of the first side of the first sheet is in direct contact with a first portion of the first side of the second sheet, and
 (iii) a second portion of the first side of the first sheet is not in direct contact with a second portion of the first side of the second sheet; and
(c) an array of sealed three-dimensional cells positioned between the first side of the first sheet and the first side of the second sheet, wherein
 (i) the boundary of the sealed three-dimensional cells comprise the second portion of the first side of the first sheet and the second portion of the first side of the second sheet, and
 (ii) a gas is contained within the array of sealed three-dimensional cells; wherein
(d) the encapsulated micro-bubble material is a coated encapsulated micro-bubble material,
(e) the coated encapsulated micro-bubble material comprises graphene,
(f) the encapsulated micro-bubble material comprises an oxygen-free gas; and
(g) the coating is a high temperature coating.

16. The assembly of claim 15, wherein the encapsulated micro-bubble material is a heat resistant material operable to withstand heat of temperatures up to 3000° C.

17. A mobile device comprising:
(a) a lightweight material comprising encapsulated micro-bubble material, wherein the encapsulated micro-bubble material comprises
 (i) a first sheet comprising one or more layers of a first atomically thin material, wherein the first sheet has a first side,
 (ii) a second sheet comprising one or more layers of a second atomically thin material, wherein
  (A) the second sheet has a first side,
  (B) a first portion of the first side of the first sheet is in direct contact with a first portion of the first side of the second sheet, and
  (C) a second portion of the first side of the first sheet is not in direct contact with a second portion of the first side of the second sheet, and
 (iii) an array of sealed three-dimensional cells positioned between the first side of the first sheet and the first side of the second sheet, wherein
  (A) the boundary of the sealed three-dimensional cells comprise the second portion of the first side of the first sheet and the second portion of the first side of the second sheet, and
  (B) a gas is contained within the array of sealed three-dimensional cells; and
(b) an array of membrane pumps operatively connected to the lightweight material, wherein the membrane pumps are operable for propelling and stabilizing the mobile device.

18. The mobile device of claim 17 further comprising:
(a) a solar cell, and
(b) an electronic controller, wherein the solar cell and the electronic controller are operatively connected to the membrane pump.

19. The mobile device of claim 17, wherein
(a) the first atomically thin material is selected from the group consisting of graphene, graphene oxide, graphene/graphene oxide, and combinations thereof; and
(b) the second atomically thin material is selected from the group consisting of graphene, graphene oxide, graphene/graphene oxide, and combinations thereof.

20. The mobile device of claim 17, wherein
(a) the first atomically thin material is graphene; and
(b) the second atomically thin material is graphene.

21. The mobile device of claim 17, wherein the encapsulated micro-bubble material can float in air at room temperature and pressure.

22. The mobile device of claim 17, wherein the closed three-dimensional features have an average size of at most about 1000 μm.

* * * * *